(12) United States Patent
Magana

(10) Patent No.: US 11,350,493 B2
(45) Date of Patent: May 31, 2022

(54) METHOD FOR CONTROLLING MICROWAVE HEATING SYSTEMS

(71) Applicant: 915 Labs, LLC, Centennial, CO (US)

(72) Inventor: Moses Alexander Magana, Topeka, KS (US)

(73) Assignee: 915 Labs, Inc., Denver, CO (US)

(*) Notice: Subject to any disclaimer, the term of this patent is extended or adjusted under 35 U.S.C. 154(b) by 558 days.

(21) Appl. No.: 16/290,235

(22) Filed: Mar. 1, 2019

(65) Prior Publication Data

US 2019/0274195 A1 Sep. 5, 2019

Related U.S. Application Data

(60) Provisional application No. 62/636,886, filed on Mar. 1, 2018.

(51) Int. Cl.
*H05B 6/64* (2006.01)
*H05B 6/68* (2006.01)
(Continued)

(52) U.S. Cl.
CPC ............ *H05B 6/6473* (2013.01); *A23L 3/003* (2013.01); *A23L 3/01* (2013.01); *H05B 6/6447* (2013.01);
(Continued)

(58) Field of Classification Search
CPC ....... H04W 24/02; H04W 88/08; A23L 3/003; A23L 3/01; A23V 2002/00; H05B 2206/045; H05B 6/6447; H05B 6/645; H05B 6/6452; H05B 6/6473; H05B 6/6491; H05B 6/6497; H05B 6/681; H05B 6/78; H05B 6/782; H05B 6/802
(Continued)

(56) References Cited

U.S. PATENT DOCUMENTS

| 2004/0104514 A1 | 6/2004 | Ishikawa |
| 2011/0123690 A1* | 5/2011 | Zavadtsev Koulik .... A23L 3/04 426/234 |
| 2015/0289323 A1 | 10/2015 | Seccombe, Jr. et al. |

FOREIGN PATENT DOCUMENTS

| EP | 2826338 A1 | 1/2015 |
| WO | 03/039608 A2 | 5/2003 |
| WO | 2016/100539 A1 | 6/2016 |

OTHER PUBLICATIONS

International Searching Authority, International Search Report and Written Opinion, issued for International Application No. PCT/US2019/020286, dated Jun. 5, 2019 (14 pages).

* cited by examiner

*Primary Examiner* — Quang T Van
(74) *Attorney, Agent, or Firm* — Polsinelli PC; David R. Mika

(57) ABSTRACT

A method for processing articles using a microwave heating system includes obtaining an operating profile for heating a type of article using the microwave heating system. The operating profile includes a temperature-time profile for a target $F_0$ value and a group of set point values for achieving the temperature-time profile, the group of set point values including a target for a control parameter of the microwave heating system. Using a control system operatively coupled to the microwave heating system, the microwave heating system is operated in accordance with the group of set point values such that each of the articles achieves an $F_0$ value that is greater than or equal to the target $F_0$ value.

20 Claims, 8 Drawing Sheets

(51) Int. Cl.
    *H05B 6/80*           (2006.01)
    *A23L 3/01*           (2006.01)
    *A23L 3/00*           (2006.01)
    *H05B 6/78*           (2006.01)

(52) U.S. Cl.
    CPC ........... *H05B 6/6452* (2013.01); *H05B 6/681* (2013.01); *H05B 6/78* (2013.01); *H05B 6/782* (2013.01); *H05B 6/802* (2013.01); *A23V 2002/00* (2013.01); *H05B 6/645* (2013.01); *H05B 6/6491* (2013.01); *H05B 6/6497* (2013.01); *H05B 2206/045* (2013.01)

(58) Field of Classification Search
    USPC ....... 219/681, 682, 684, 687, 688, 710, 700, 219/759, 701–702; 426/234, 241, 243; 422/22, 292, 308; 99/483, 451, 477, 417
    See application file for complete search history.

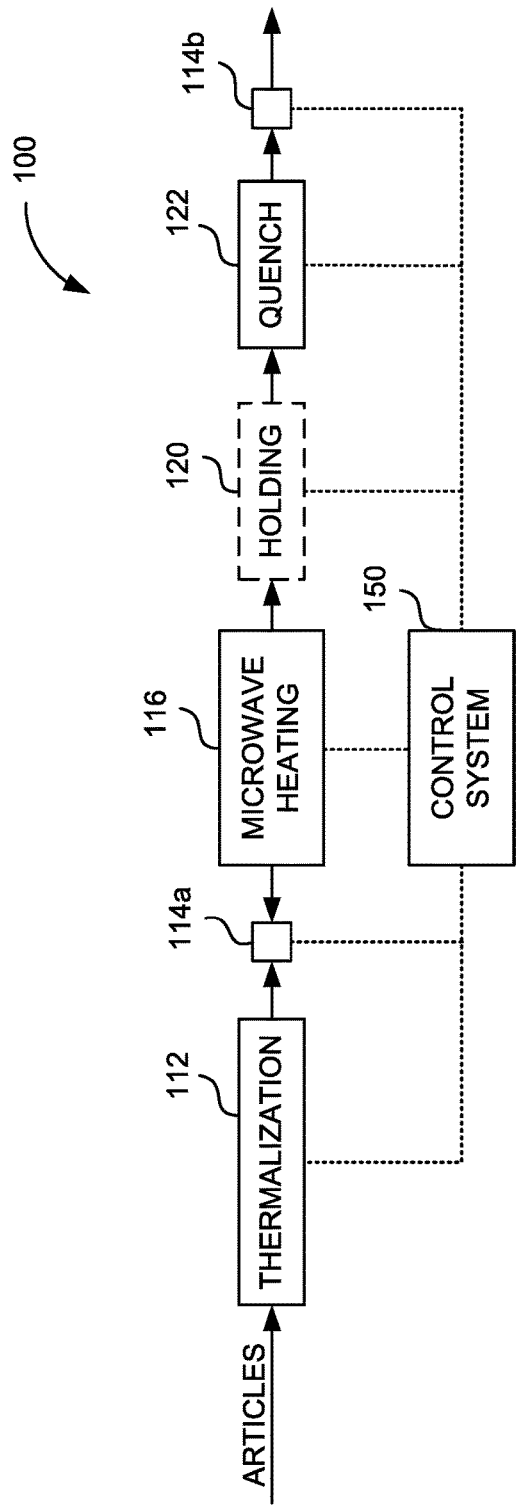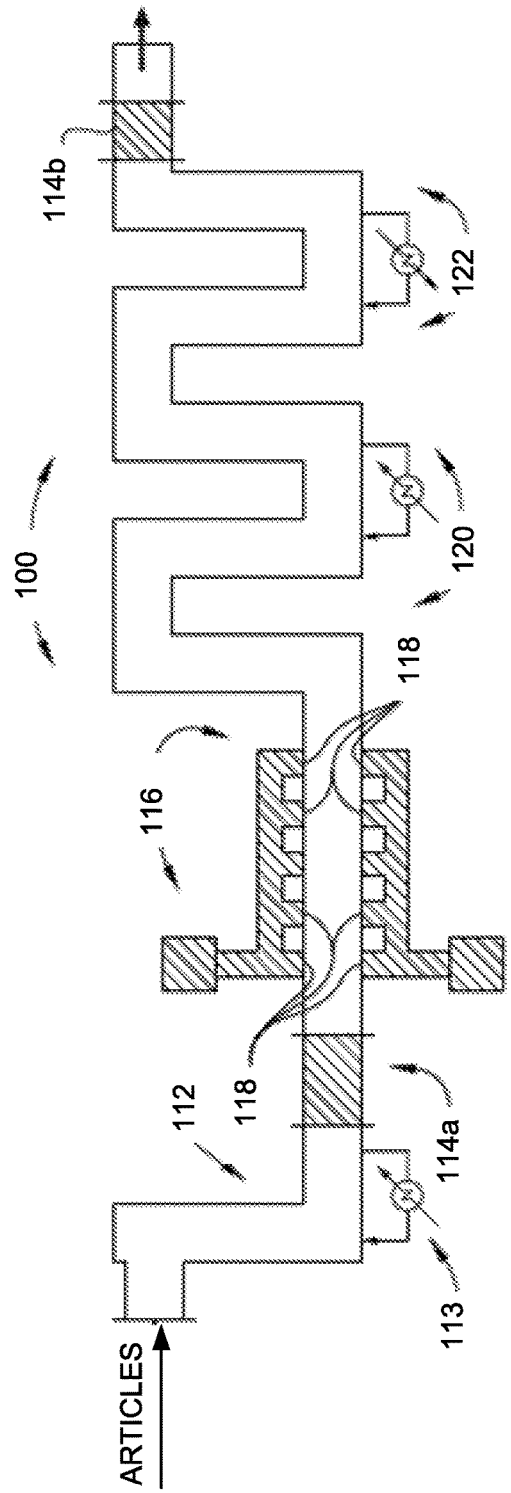
FIG. 1A
FIG. 1B

METHOD FOR CONTROLLING MICROWAVE HEATING SYSTEMS

CROSS-REFERENCE TO RELATED APPLICATIONS

This application is related to and claims priority under 35 U.S.C. § 119(e) from U.S. Patent Application No. 62/636,886 filed Mar. 1, 2018, titled "METHOD FOR CONTROLLING MICROWAVE HEATING SYSTEMS", the entire contents of which are incorporated by reference for all purposes.

TECHNICAL FIELD

Aspects of the present disclosure are directed to heating systems in which articles are heated, at least in part, by exposure to microwave energy. In particular, the present disclosure is directed to approaches for controlling such microwave heating systems to ensure that the articles being heated achieve desired levels of pasteurization and sterilization.

BACKGROUND

Microwave energy has been used as a source of energy to rapidly and effectively heat articles in many different applications. Because of its ability to quickly and thoroughly heat an article, microwave energy in particular may be employed in specific applications where the rapid achievement of a prescribed minimum temperature is desirable, such as, for example, pasteurization or sterilization processes. Additionally, because microwave energy is generally volumetric, it may be useful for heating many dielectrically and thermally sensitive articles, such as food and pharmaceuticals. However, to date, the complexities and nuances of safely and effectively applying microwave energy, particularly on a commercial scale, have severely limited its application in rapid thermal processing. Accordingly, a need exists for efficient and cost-effective industrial scale microwave energy heating systems suitable for use in a wide variety of end-use applications and corresponding methods of controlling and operating such systems.

SUMMARY

In one aspect of the present disclosure, a method of controlling a microwave heating system is provided. The method includes obtaining an operating profile for heating a type of article in a liquid-filled microwave heating system, the operating profile including a temperature-time profile for a target $F_0$ value and a group of set point values for achieving the temperature-time profile, the group of set point values including a target for a control parameter of the microwave heating system. The method further includes, using a control system operatively coupled to the microwave heating system, operating the microwave heating system by passing a carrier loaded with articles of the type of article corresponding to the operating profile through a liquid-filled microwave heating chamber along a convey line such that the articles are submerged in a liquid medium within the microwave heating chamber. Operating the microwave heating system further includes discharging microwave energy into the microwave heating chamber while passing the carrier through the microwave heating chamber to heat the articles. The method also includes removing the articles from the microwave heating system. Operating the microwave heating system results in each of the plurality of articles achieving an $F_0$ value that is greater than or equal to the target $F_0$ value.

In another aspect of the present disclosure, a method for processing articles is provided. The method includes obtaining an operating profile for heating a type of article in a liquid-filled microwave heating system, the operating profile including a temperature-time profile for a target $F_0$ value and a first group of set point values for achieving the temperature-time profile. The method further includes selecting the first group of set point values from the operating profile, the first group of set point values including a first target value for a control parameter of the microwave heating system, the first target value used by a control system operatively coupled to the microwave heating system as a first operating set point for the control parameter. The method also includes, using the control system operatively coupled to the microwave heating system, operating the microwave heating system by passing a carrier loaded with articles through a liquid-filled microwave heating chamber along a convey line such that the articles are submerged in a liquid medium during passing through the microwave heating chamber. The control system further operates the microwave heating system by discharging microwave energy into the microwave heating chamber to heat the plurality of articles while passing the carrier through the microwave heating chamber and measuring an actual value of the control parameter to provide a measured value while heating the plurality of articles. The method further includes, in response to determining a difference between the measured value and the first target value exceeds a predetermined allowable difference, selecting a second group of set point values from the operating profile, the second group of set point values including a second target value for the control parameter and, using the control system, operating the microwave heating system according to the second group of set point values, including using the second target value as a second operating set point for the control parameter.

In yet another aspect of the present disclosure, a microwave heating system is provided. The microwave heating system includes liquid-filled processing sections including a microwave heating chamber section. Each of the processing sections includes a respective convey segment configured to transport a carrier with multiple articles through the processing section such that the articles are submerged in a liquid medium during passing through the processing section. The microwave heating system further includes a control system operatively coupled to each of the plurality of processing sections to control operation of the processing sections. The control system is adapted to access an operating profile associated with a type of article, the operating profile including a temperature-time profile for a target $F_0$ value and a first group of set point values for achieving the temperature-time profile, the first group of set point values including a first target value for a control parameter of one of the processing sections. The control system is further adapted to operate the processing section in accordance with the group of set point values including using the first target value as a first operating set point for the control parameter and to pass a carrier loaded with articles through each processing section including the microwave heating chamber section. While passing the carrier through the microwave heating chamber, the control system is adapted to cause the microwave energy to be discharged into the microwave heating chamber to heat the plurality of articles. The control system further measures an actual value of the control parameter to provide a measured value and, in response to determining a difference between the measured value and the first target value exceeds a predetermined allowable difference, to select a second group of set point values from the operating profile, the second group of set point values including a second target value for the control parameter. The control system is further adapted to operate the processing section according to the second group of set point values, including using the second target value as a second operating set point for the control parameter, following selecting of the second group of set point values.

BRIEF DESCRIPTION OF THE DRAWINGS

The foregoing and other objects, features, and advantages of the present disclosure set forth herein will be apparent from the following description of particular implementations of those inventive concepts as illustrated in the accompanying drawings. It should be noted that the drawings are not necessarily to scale; however, emphasis instead is being placed on illustrating the principles of the inventive concepts. It is intended that the implementations and figures disclosed herein are to be considered illustrative rather than limiting.

FIG. 1A is a process flow diagram depicting one implementation of a microwave heating system for heating one or more articles, particularly illustrating a system comprising a thermalization zone, a microwave heating zone, an optional holding zone, a quench zone, and a pair of pressure adjustment zones;

FIG. 1B is a schematic diagram of a microwave heating system configured according to one implementation of the present disclosure, particularly each of the zones of the microwave heating system outlined in the diagram provided in FIG. 1A;

DETAILED DESCRIPTION

Figure 2:
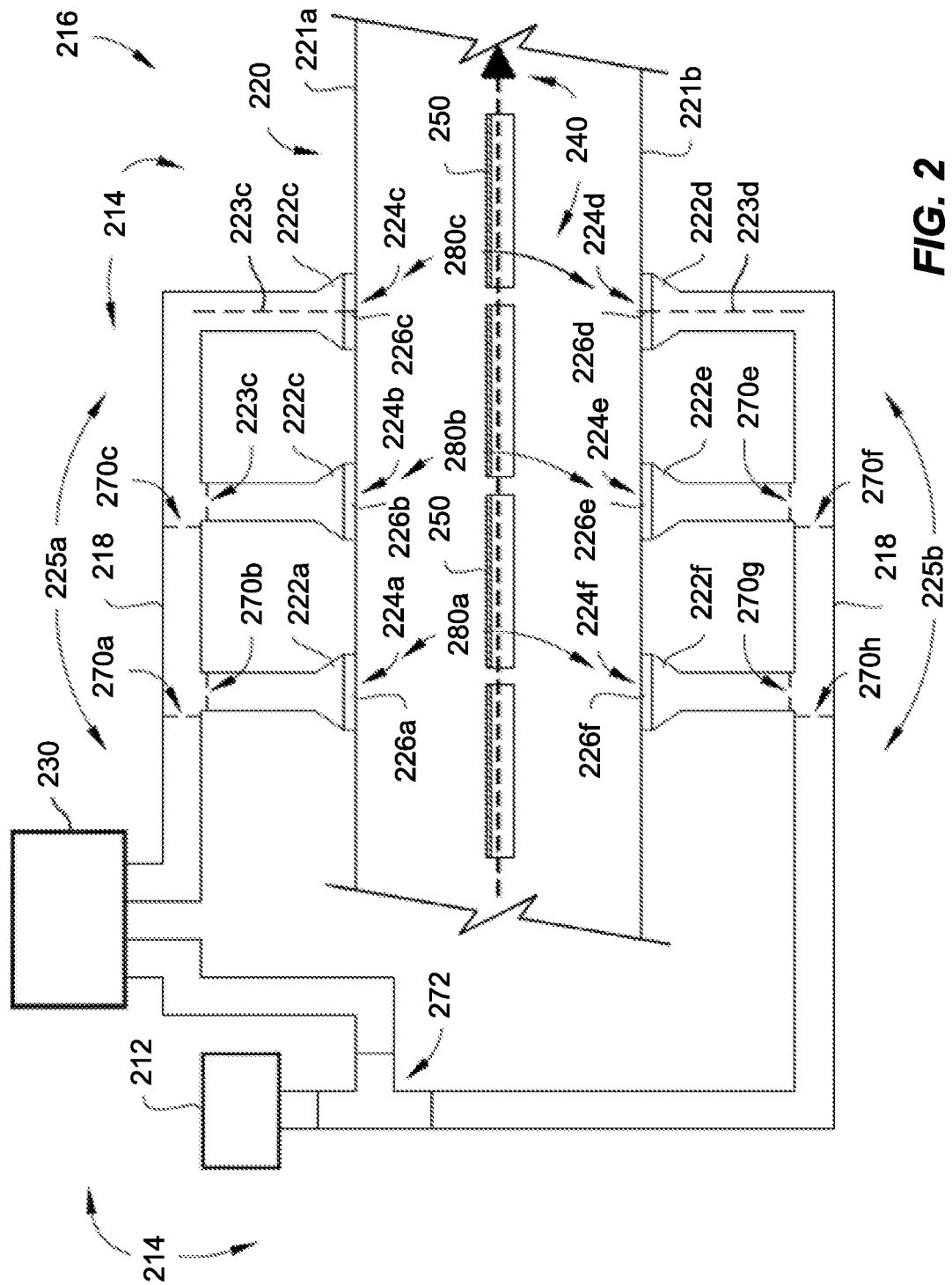
FIG. 2 is a schematic illustration of a microwave heating zone configured according to one embodiment of the present invention, particularly illustrating the heating vessel and the microwave distribution system.

The present disclosure relates to methods and systems for pasteurizing or sterilizing articles in a liquid-filled microwave heating system. Methods for controlling this type of microwave heating system are also described herein and may be used to ensure that the articles being heated achieve desired levels of pasteurization and sterilization.

Systems and methods in accordance with the present disclosure utilize operating profiles for controlling the operation of microwave heating systems so that the articles being heated by the system achieve desired levels pasteurization or sterilization. The operating profiles are based on empirical data and provide specific target values for one or more microwave system parameters. Microwave heating systems operated according to these operating profiles can help ensure that sufficient pasteurization or sterilization of treated articles is achieved, while also ensuring that any processing criteria specified to impact the final properties of the article (e.g., taste, texture, appearance) are also met. The operating profiles described herein may be used to operate the system under typical operating conditions, or may be used to manage process deviations. These profiles may also be used to evaluate operating data from completed runs in order to determine whether or not articles treated during the completed run meet certain processing criteria, including, but not limited to, target lethality rates.

In general, pasteurization involves the rapid heating of an item to a minimum temperature between about 80° C. and about 100° C., while sterilization involves heating the item to a minimum temperature between about 100° C. and about 140° C. In some cases, the processes and systems described herein may be configured for pasteurization, sterilization, or both pasteurization and sterilization. Examples of suitable types of items to be pasteurized and/or sterilized include, but are not limited to, packaged foodstuffs, beverages, medical instruments and fluids, dental instruments and fluids, veterinary fluids, and/or pharmaceutical fluids.

Implementations of the present disclosure may be carried out in a variety of different microwave heating systems including, for example, those similar to the microwave heating systems described in U.S. Pat. No. 9,357,590 as well as those described in U.S. Pat. No. 7,119,313, each of which are incorporated herein by reference in their entirety to the extent not inconsistent with the present disclosure.

Turning now to FIGS. 1A and 1B, a schematic representation of the major steps in a microwave heating system of the present disclosure is depicted in FIG. 1A, while FIG. 1B depicts one implementation of a microwave system 100 operable to heat a plurality of articles according to the process outlined in FIG. 1A. As used herein, the term "microwave energy" generally refers to electromagnetic energy having a frequency between 300 MHz and 30 GHz.

As shown in FIGS. 1A and 1B, one or more articles can initially be introduced into a thermalization section 112, wherein the articles can be thermalized to a substantially uniform temperature. Once thermalized, the articles can then be optionally passed through a pressure adjustment section 114a before being introduced into a microwave heating section 116. In microwave heating section 116, the articles can be rapidly heated using microwave energy discharged into at least a portion of the heating section by one or more microwave launchers, generally illustrated as launchers 118 in FIG. 1B. The heated articles can then optionally be passed through an optional holding section 120, wherein the articles can be maintained at a constant temperature for a specified amount of time. Subsequently, the articles can then be passed to a quench section 122, wherein the temperature of the articles can be quickly reduced to a suitable handling temperature. Thereafter, the cooled articles can optionally be passed through a second pressure adjustment section 114b before being removed from system 100 and further utilized.

According to one implementation of the present disclosure, each of the above-described thermalization, microwave heating, holding, and/or quench sections 112, 116, 120, and 122 can be defined within a single vessel, as generally depicted in FIG. 1B, while, in another implementation, at least one of the above-described stages can be defined within one or more separate vessels. According to one implementation, at least one of the above-described steps can be carried out in a vessel that is at least partially filled with a liquid medium in which the articles being processed can be at least partially submerged. As used herein, the term "filled" denotes a configuration where at least 50 percent of the specified volume is filled with the liquid medium. In certain implementations of the present disclosure, "filled" volumes can be at least about 75 percent, at least about 90 percent, at least about 95 percent, or 100 percent full of the liquid medium.

When used, the liquid medium used may include any suitable type of liquid. The liquid medium may have a dielectric constant greater than the dielectric constant of air and, in one implementation, can have a dielectric constant similar to the dielectric constant of the articles being processed. Water (or liquid media comprising water) may be particularly suitable for systems used to heat edible and/or medical devices or articles. In one implementation, additives, such as, for example, oils, alcohols, glycols, and salts may optionally be added to the liquid medium to alter or enhance its physical properties (e.g., boiling point) during processing, if needed.

Microwave system 100 can include at least one conveyance system (not shown in FIGS. 1A and 1B) for transporting the articles through one or more of the processing sections described above. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system utilized by microwave system 100 can be configured in a generally fixed position within the vessel or at least a portion of the system can be adjustable in a lateral or vertical direction.

In some cases, the articles may be transported along the convey line loaded into one or more carriers configured to secure the articles as they pass through one or more of the processing sections of the microwave heating system. A description of carriers that might be used with systems and methods of the present disclosure is provided in U.S. patent application Ser. No. 15/284,173, the entirety of which is incorporated herein by reference.

The articles processed by the microwave heating system 100 may include packages of any suitable size and/or shape and may contain any food or beverage, any medical, dental, pharmaceutical, or veterinary fluid, or any instrument capable of being processed in a microwave heating system. Examples of suitable articles can include, but are not limited to, packaged foodstuffs such as, for example, fruits, vegetables, meats, pastas, pre-made meals, soups, stews, jams, and even beverages. The specific type of packaging is not limiting, but at least a portion of it must be at least partially microwave transparent in order to facilitate heating of the contents using microwave energy.

The articles can include individual packages each having, for example, a generally rectangular or prism-like shape. In some cases, the articles can have a top and a bottom and the top and bottom of each article can have different widths. For example, in some cases, the top can be wider than the bottom and top edge of each article may be longer and wider than the bottom edge. In other cases, the top may be narrower than the bottom when, for example, the article includes a flexible pouch. Specific types of articles can include, but are not limited to, flexible and semi-flexible pouches with or without spouts, cups, bottles, and other rigid or semi-rigid containers having circular, elliptical, or other cross-sectional shapes with or without lidding, including flexible lidding. The articles may be constructed of any material, including plastics, cellulosics, and other microwave-transparent materials.

As shown in FIGS. 1A and 1B, the articles introduced into microwave system 100 are initially introduced into thermalization section 112, wherein the articles are thermalized to achieve a substantially uniform temperature. For example and without limitation, in at least certain implementations of the present disclosure at least about 85 percent, at least about 90 percent, at least about 95 percent, at least about 97 percent, or at least about 99 percent of all the articles withdrawn from the thermalization section 112 have a temperature within about 5° C., within about 2° C., or within 1° C. of one another. As used herein, the terms "thermalize" and "preheat" generally refer to a step of temperature equilibration or equalization. Depending on the initial and desired temperature of the articles being thermalized, the temperature control system of thermalization section 112, illustrated in FIG. 1A as heat exchanger 113, can be a heating and/or cooling system.

When the thermalization section 112 is at least partially filled with a liquid medium, the articles can be at least partially submerged in the liquid during the passing. The liquid medium in the thermalization zone 112 can be warmer or cooler than the temperature of the articles passing therethrough. In some implementations and without limitation the liquid medium may have an average bulk temperature of at least about 30° C., at least about 35° C., at least about 40° C., at least about 45° C., at least about 50° C., at least about 55° C., or at least about 60° C. and/or not more than about 100° C., not more than about 95° C., not more than about 90° C., not more than about 85° C., not more than about 80° C., not more than about 75° C., not more than about 70° C., not more than about 65° C., or not more than about 60° C.

The thermalization step can be carried out under ambient pressure or it may be carried out in a pressurized vessel. For example and without limitation, when pressurized, thermalization may be performed at a pressure of at least about 1 psig, at least about 2 psig, at least about 5 psig, or at least about 10 psig and/or not more than about 80 psig, not more than about 50 psig, not more than about 40 psig, or not more than about 25 psig. When the thermalization zone 112 is liquid-filled and pressurized, the pressure may be in addition to any head pressure exerted by the liquid. Articles undergoing thermalization can have an average residence time in the thermalization zone 112 of various durations. For example and without limitation, in certain implementations, the residence time may be at least about 1 minute, at least about 5 minutes, at least about 10 minutes and/or not more than about 60 minutes, not more than about 20 minutes, or not more than about 10 minutes. The articles withdrawn from the thermalization zone 112 can have differing average temperatures. For example and without limitation, in certain implementations the articles may have an average temperature of at least about 20° C., at least about 25° C., at least about 30° C., at least about 35° C. and/or not more than about 90° C., not more than about 75° C., not more than about 60° C., or not more than about 50° C.

In one implementation wherein thermalization zone 112 and microwave heating zone 116 are operated at substantially different pressures, the articles removed from thermalization zone 112 can first be passed through a pressure adjustment zone 114a before entering microwave heating zone 116, as generally depicted in FIGS. 1A and 1B. Pressure adjustment zone 114a can be any zone or system configured to transition the articles being heated between an area of lower pressure and an area of higher pressure. In one implementation, pressure adjustment zone 114a can be configured to transition the articles between two zones having a pressure difference of at least about 1 psi, at least about 5 psi, at least about 10 psi, at least about 12 psi and/or not more than about 75 psi, not more than about 50 psi, not more than about 40 psi, or not more than about 35 psi. When the cooling/quench zone 122 shown in FIGS. 1A and 1B is operated at a different pressure than the microwave heating zone 116, another pressure adjustment section may be present to transition the articles between the microwave heating zone or hold zone 120 and cooling/quench zone 122. In some cases, the first pressure adjustment zone 114a can transition the articles from a lower-pressure thermalization zone 112 to a higher-pressure microwave heating zone 116, while the second pressure adjustment section 114b may transition the articles from a higher-pressure holding zone 120 to a lower-pressure cooling zone 122 or from the lower-pressure cooling zone 122 to ambient conditions. Other configurations of pressurization sections are also possible.

Referring again to FIGS. 1A and 1B, the articles exiting thermalization section 112, and optionally passed through pressure adjustment section 114a, as described above, can then be introduced into microwave heating section 116. In microwave heating section 116, the articles can be rapidly heated with a heating source that uses microwave energy. In one implementation, various configurations of the microwave heating section 116 can utilize microwave energy having a frequency of about 915 MHz or a frequency of about 2.45 GHz, both of which have been generally designated as industrial microwave frequencies. In addition to microwave energy, the microwave heating section 116 may optionally utilize one or more other heat sources such as, for example, conductive or convective heating or other conventional heating methods or devices. However, in at least some implementations of the present disclosure at least about 50, at least about 55, at least about 60, at least about 65, at least about 70, at least about 75, at least about 80, at least about 85, at least about 90, or at least about 95 percent of the energy used to heat the articles in the microwave heating section be microwave energy.

As illustrated in FIG. 1A, operation of the various section so the microwave heating system 100 may be controlled and facilitated by a control system 150. The control system 150 generally includes one or more computing devices adapted to communicate with components of one or more of the sections of the microwave heating system 100. Such communication may include receiving signals and data from sensors, switches, or other components of the microwave heating system 100 and/or transmitting signals, such as control signals, and data to components of the microwave heating system 100 such as, without limitation, actuators, heating elements, drives, lights, alarms, screens, and the like. The control system 150 may be configured to receive input from a user and to control operation of the microwave heating system 100, at least in part, in response to such input. Similarly, the control system 150 may be configured to at least partially control operation of the microwave automatically.

Turning now to FIG. 2, one implementation of a microwave heating section 216 is illustrated as generally comprising a microwave heating chamber 220, at least one microwave generator 212 for generating microwave energy and a microwave distribution system 214 for directing at least a portion of the microwave energy from generator 212 to microwave chamber 220. Microwave distribution system 214 comprises a plurality of waveguide segments 218 and one or more microwave launchers, shown as launchers 222a-f in FIG. 2, for discharging microwave energy into the interior of microwave chamber 220. As shown in FIG. 2, microwave heating section 216 can further comprise a conveyance system 240 for transporting carriers 250 loaded with articles to be heated through microwave chamber 220. Each of the components of microwave heating section 216, according to various implementations of the present disclosure, is now discussed in detail.

As they move along the conveyance system 240 in the microwave heating section 216, the articles may be heated so that the coldest portion of each article achieves a minimum target temperature. When the microwave heating section 216 is a sterilization or pasteurization system, the target temperature can be a sterilization or pasteurization target temperature. For example and without limitation, the target temperature may be at least about 65° C., at least about 70° C., at least about 75° C., at least about 80° C., at least about 85° C., at least about 90° C., at least about 95° C., at least about 100° C., at least about 105° C., at least about 110° C., at least about 115° C., at least about 120° C., at least about 121° C., at least about 122° C. and/or not more than about 130° C., not more than about 128° C., or not more than about 126° C.

When the microwave heating chamber 220 is liquid-filled, the average bulk temperature of the liquid in the microwave heating chamber 220 may vary and, in some cases, can depend on the amount of microwave energy discharged into the microwave heating chamber 220. The average bulk temperature of the liquid in the microwave heating chamber 220 can be at least about 70° C., at least about 75° C., at least about 80° C., at least about 85° C., at least about 90° C., at least about 95° C., at least about 100° C., at least about 105° C., at least about 110° C., at least about 115° C., or at least about 120° C. and/or not more than about 135°, not more than about 132° C., not more than about 130° C., not more than about 127° C., or not more than about 125° C.

As the articles pass through the microwave heating chamber 220, they may be heated to the target temperature in a relatively short period of time, which can help minimize any damage or degradation of the articles caused by prolonged exposure to high temperatures. For example, the average residence time of each article passing through the microwave heating section 216 can be, in certain implementations and without limitation, at least about 5 seconds, at least about 20 seconds, at least about 60 seconds and/or not more than about 10 minutes, not more than about 8 minutes, not more than about 5 minutes, not more than about 3 minutes, not more than about 2 minutes, or not more than about 1 minute. The increase in minimum temperature of the articles heated in the microwave heating section 216 may also vary. For example, in certain implementations, the minimum temperature of the articles can increase by at least about 20° C., at least about 30° C., at least about 40° C., at least about 50° C., at least about 75° C. and/or not more than about 150° C., not more than about 125° C., or not more than about 100° C.

The microwave heating chamber 220 can be operated at approximately ambient pressure. Alternatively, it may be a pressurized microwave chamber that operates at various pressures including, without limitation, at least about 5 psig, at least about 10 psig, at least about 15 psig, or at least about 17 psig and/or not more than about 80 psig, not more than about 60 psig, not more than about 50 psig, or not more than about 40 psig above ambient pressure. As used herein, the term "ambient" pressure refers to the pressure exerted by the fluid in the microwave heating chamber 220 without the influence of external pressurization devices.

In some cases, the articles passing through the microwave heating section 216 may be exposed to microwave energy intermittently, with alternating periods of exposure to microwave energy followed by "dwell" period during which no microwave energy is discharged toward the articles, but during which the articles may thermalize. In some cases, the articles may be moving between adjacent microwave launchers or sets of launchers during at least a portion of the dwell period, while, in other cases, the articles may remain stationary during the dwell period. As the articles move through the microwave heating chamber 220, the articles may move in single direction between the entrance and exit of the microwave heating chamber 220. Alternatively, the carrier or groups of articles may be moved in a "back-and-forth" pattern along the convey line, as described in detail in U.S. Patent Application Ser. No. 62/471,664 and Ser. No. 15/921,921, each of which is incorporated herein by reference in their entirety to the extent not inconsistent with the present disclosure.

As shown in FIGS. 1A and 1B, upon exiting the microwave heating section 116, the articles may be passed to a holding section 120, wherein the temperature of the articles can be maintained at or above a certain minimum target temperature for a predetermined period of time. For example and without limitation, in the holding section 120, the temperature of the coldest part of the article can be held at a temperature at or above a predetermined minimum temperature of at least about 70° C., at least about 75° C., at least about 80° C., at least about 85° C., at least about 90° C., at least about 95° C., at least about 100° C., at least about 105° C., at least about 110° C., at least about 115° C., or at least about 120° C., at least about 121° C., at least about 122° C. and/or not more than about 130° C., not more than about 128° C., or not more than about 126° C., for a period of time (or "holding period") of at least about 1 minute, at least about 2 minutes, or at least about 4 minutes and/or not more than about 20 minutes, not more than about 16 minutes, or not more than about 10 minutes.

Once the heated articles exit the holding section 120, the articles may then be introduced into a cooling or quench section 122, wherein the articles are rapidly cooled via submersion in a cooled fluid. The quench section 122 may reduce the external surface temperature of the articles by various amounts. For example, in certain implementations the external surface temperature may be reduced by at least about 30° C., at least about 40° C., at least about 50° C. and/or not more than about 100° C., not more than about 75° C., or not more than about 50° C. in a time period of at least about 1 minute, at least about 2 minutes, at least about 3 minutes and/or not more than about 10 minutes, not more than about 8 minutes, or not more than about 6 minutes. Any suitable fluid may be used in the quench section 122 and the fluid may include a liquid similar to, or different than, the liquid used in the microwave heating section 116 and/or the holding section 120. When removed from the quench section 122, the temperature of the cooled articles may vary. For example and without limitation, in certain implementations the cooled articles can have a temperature of at least about 20° C., at least about 25° C., at least about 30° C. and/or not more than about 70° C., not more than about 60° C., or not more than about 50° C. Once removed from the quench section 122, the cooled, treated articles can then be removed from the microwave heating system 100 for subsequent storage and/or use.

The present disclosure provides microwave heating systems and methods for operating microwave heating systems using an operating profile. In some cases, a microwave heating system may be selectively operated according to a single operating profile, while, in other cases, it may be operated according to two or more different operating profiles. When a system is operated by two or more different operating profiles, each profile can be specifically designed for heating a different type of article or to heat the same type of article differently. Each operating profile may be designed to process a certain type of article and, so, may include certain specifications for the type of article to be heated according to that profile.

In some cases, an operating profile may be selected to heat a certain type of article. Thus, each profile may be created based on certain specifications for one or more article parameters. Examples of the article parameters specified by an operating profile can include, but are not limited to, food type and properties (e.g., pH, weight, sugar content, thickness, density, dielectric constant, moisture content, and others), package type and properties (e.g., shape, thickness, size, microwave transparency, thermal conductivity, barrier properties, and others), as well as the arrangement of the food or beverage within the package (e.g., percent filled, head space, and others). In some cases, an operating profile may specify target values for one or more of the above article parameters in order to delineate the types of articles that can be processed according to that profile. Alternatively, an operating profile may not specify any article parameters, or may simply provide values or ranges of values for the target parameter as a guideline.

Figure 3:
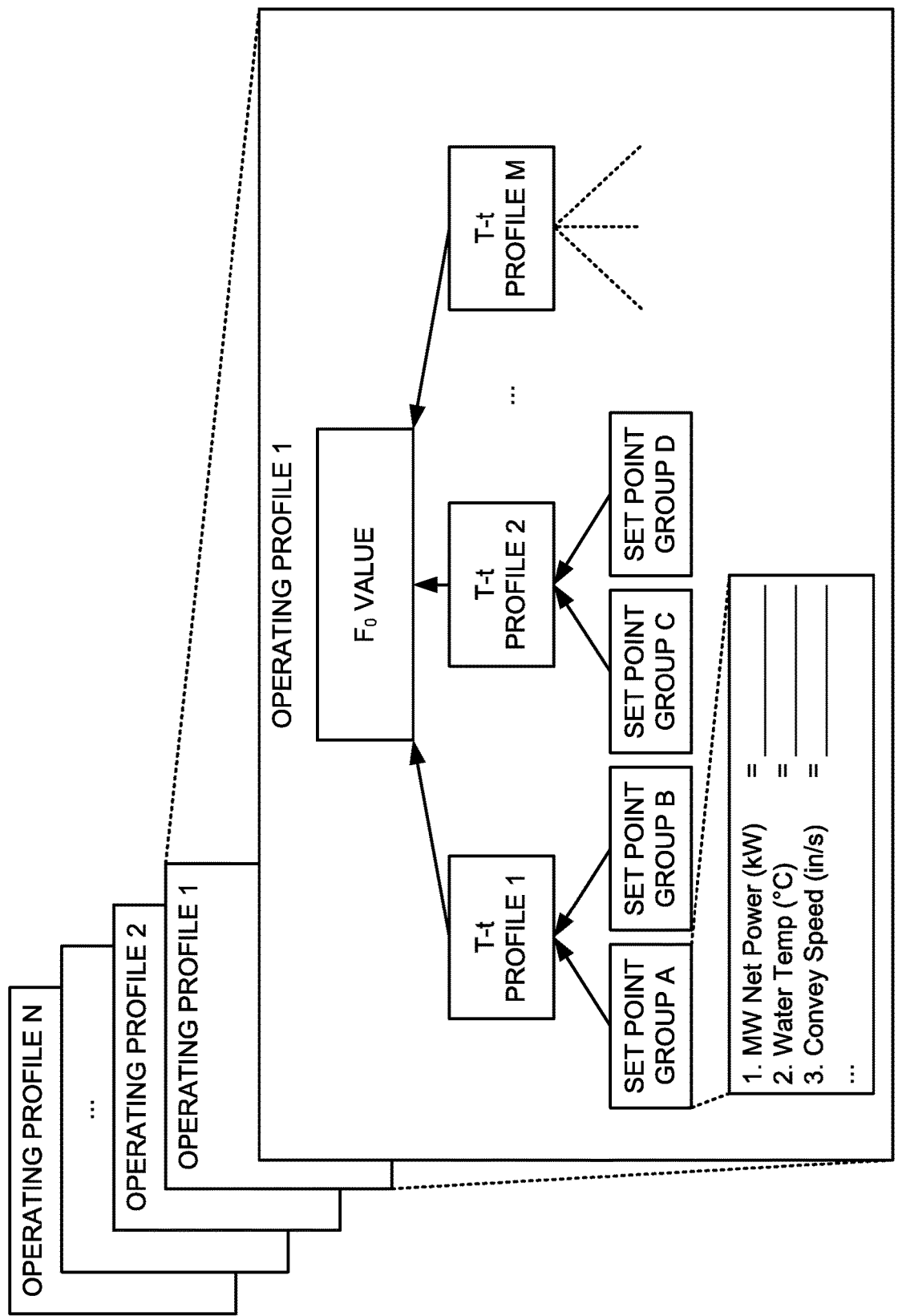
FIG. 3 is an illustration of an operating profile schema 300 in accordance with the present disclosure.

FIG. 3 is an illustration of an operating profile schema 300 in accordance with the present disclosure. As described below in further detail, the operating profile schema 300 includes a collection of operating profiles 302*a-n*, each of which generally store information related to the operation and control of microwave heating systems, such as the microwave heating system 100 of FIG. 1A. The following description refers to and discusses the operating profile 302*a* and its components in further detail; however, it should be appreciated that, unless otherwise the following description similarly applies to the other operating profiles 302*b-n*.

In general, each operating profile 302*a-n* includes one or more groups of operational set points that may be used to control various aspects of the microwave heating system during processing of articles. Each group of set points is further associated with a temperature-time profile that generally describes the thermal behavior of an article over time when that particular group of set points is applied. Each temperature-time profile may in turn be associated with a particular level of pasteurization or sterilization. Accordingly, an operational profile may include one or more sterilization or pasteurization levels, each of which results from one or more temperature-time profile. Each of the temperature-time profiles may in turn be achieved using one or more groups of associated operational set points.

As shown in FIG. 3, the operating profile 302*a* can include at least one target $F_0$ value 304 specifying a desired level of pasteurization or sterilization for the articles being heated. In general, an $F_0$ value (which is also commonly referred to as a "sterilization value") is a cumulative representation of all thermal treatments encountered by an article during processing and can represent the minimum level of microbial lethality achieved by an article during heating. Higher values for $F_0$ indicate higher microbial lethality levels, which correspond to higher levels of pasteurization or sterilization. The reference microbe used to measure lethality levels generally depends on whether the article is being pasteurized or sterilized, with *Clostridium botulinum* typically being used to characterize the microbial lethality of a sterilization process. The reference microbe used for pasteurization varies with the specific type of article being pasteurized, but can include, for example, *Salmonella* or *Escherichia coli*.

In some cases, such as that illustrated in FIG. 3, an operating profile may include a single target $F_0$ value 304. Alternatively, an operating profile may include at least two, at least three, at least four, or five or more different target $F_0$ values. Each target $F_0$ value may be a single point value, or it may be a range of values. In some cases, the operating profile may not include any express values or ranges for a target $F_0$ value, but the temperature-time profiles and groups of set point values within the profile (each of which are discussed below in further detail) may be pre-selected in order to achieve an absolute minimum $F_0$ value, even though the profile may not list a specific target $F_0$ value. Typically, a target $F_0$ value of around 3 or 4 is considered to be an absolute minimum, with values around 5 or 6 being a more practical minimum. In some cases, the operating profile can include at least one target $F_0$ with a value of at least about 6, at least about 7, at least about 8, at least about 9, or at least about 10 and/or not more than about 15, not more than about 14, not more than about 13, not more than about 12, not more than about 11, or not more than about 10. Again, the reference microbe may be one or more of the above, or it may be a different microbe, depending on the type of article being heated and whether the article is being pasteurized or sterilized.

The operating profile 302a may also include at least one temperature-time profile 306a-306m, shown generally in FIG. 3 as "T-t PROFILE 1" to "T-t PROFILE M". The temperature-time profile (which can also be called the heating rate curve) is generally describes the temperature of an article throughout the heating process. In one implementation, the temperature-time profile may correspond to temperature measurements obtained from the coldest portion of the article or where the heating rate is slowest in order to ensure that the entire article achieves the desired degree of pasteurization or sterilization. Alternatively, or in addition, the temperature-time profile may be correspond to temperature measurements at another portion of the article, such as, for example, the hottest or quickest heating point or the point that achieves an average temperature or exhibits an average heating rate. In still other cases, the temperature-time profile may be based on temperature measurements at the geometric center of the article. In certain implementations, a first temperature-time profile may corresponds to measurements at the coldest (or slowest heating) portion of the article such that the treated article is ensured to meet a minimum level of pasteurization or sterilization, while a second temperature-time profile may corresponds to measurements at the hottest (or quickest heating) portion of the article may help ensure product quality by, for example, minimizing overcooking of the article.

Each temperature-time profile in an operating profile achieves an $F_0$ value. Accordingly, even if the operating profile does not include a specific target $F_0$ value (such as the $F_0$ value 304 of FIG. 3), the temperature-time profile will achieve an $F_0$ value and may, for example, be selected to achieve some desirable minimum, such as, for example, an $F_0$ of at least 5 or 6. An operating profile may include a single temperature-time profile or it may include at least about 2, at least about 3, or at least about 4 different temperature-time profiles, each selected to achieve a target $F_0$ value. When the operating profile includes two or more different temperature-time profiles, each profile may achieve the same, or a different, target $F_0$ value than one or more of the other temperature-time profiles in the same operating profile. For example, in FIG. 3, each of the T-t profiles 304a-304m is illustrated as corresponding to the $F_0$ value 304. In other words, heating an article according to any of the temperature-time profiles 306a-306m will generally result in achieving the $F_0$ value 304. However, in other implementations, the temperature-time profile 306a may result in the $F_0$ value 304 while the temperature-time profile 306b may result in a second $F_0$ value different than the $F_0$ value 304.

The $F_0$ value of the article during the heating process may then be calculated by integrating the area under the temperature-time curve above a minimum temperature. For example, if an article is being pasteurized, the minimum temperature may be at least about 70° C., and the $F_0$ value can be calculated by integrating the area under the temperature-time curve where the article had a temperature of 70° C. (or other minimum) or above. For sterilization, this minimum temperature may be around 120° C. or so. Thus, each temperature-time profile provided in an operating profile is selected to achieve a certain target $F_0$ value, whether or not the target $F_0$ value is expressly specified in the operating profile.

In certain implementations, one or more of the temperature-time profiles may obtained by monitoring temperature of an article during a heating process. For example, one or more articles of a certain type may be equipped with one or more temperature sensors (e.g., thermocouples) and subjected to a heating process according to a first group of operational set points. The temperature-time profile may then be generated based on the temperature data obtained from the thermocouples and associated time data corresponding to when the temperature data was obtained. The resulting curve may then be used to calculate a corresponding $F_0$ value as described above. The foregoing process may be repeated for multiple articles of the same type using different groups of operational set points to generate multiple temperature-time profiles, each of which resulting in a particular $F_0$ value. The groups of set point values may then be organized based on the relative similarity of the temperature-time profiles and $F_0$ values into a tree or similar linked structure, such as illustrated in FIG. 3.

It should be appreciated that the temperature and time data of the temperature-time profiles 306a-306m illustrated in FIG. 3 may be specific or may correspond to a range of values. For example, a given temperature-time profile may include a minimum temperature for a period of time of the heating process, a maximum temperatures for a period of time of the heating process, a specific target temperature at a specific time in the heating process, or any variation thereof. Accordingly, while groups of operational set points may result in different thermal behavior for an article, the thermal behavior for groups of set points may nevertheless be sufficiently similar or otherwise meet common thresholds such that the resulting time-temperature profiles for the groups of set points are considered the same for purposes of generating an operating profile.

The operating profiles as described herein also include at least one group of set points. For example, the operating profile 302a of FIG. 3 includes set point groups A-D 308a-d, with set point groups A and B achieving T-t profile 1 306a and set point groups C and D achieving T-t profile 2 306b. Each group of set points includes one or more target values for at least one microwave system parameter. These target values may be used to control the operation of the microwave heating system so that the temperature of the articles passed through the heating system approximates the temperature-time profile to achieve the target $F_0$ value.

Each operating profile may include a single group of set point values, or it may, in some cases, include at least 2, at least 3, at least 4, at least 5, at least 6, at least 7, at least 8, at least 9, or at least 10 different groups of set point values. Although not necessarily limited on the upper end, an operating profile may include less than 50, less than 40, less than 30, less than 20, or less than 15 groups of set point values. In cases where an operating profile includes two or more temperature-time profiles, at least one group of set point values can be selected to achieve the same temperature-time profile. In some cases, two or more different groups of set point values may be selected to achieve the same temperature-time profile. Alternatively, or in addition, two different groups of set point values may be selected to achieve different temperature-time profiles.

For example, an operating profile can include a single temperature-time profile and two or more groups of set point values selected to achieve that temperature-time profile. In another example, an operating profile could include two temperature-time profiles and at least one group of set point values selected to achieve each temperature-time profile. When an operating profile includes at least two-temperature time profiles, each profile may have at least 1, at least 2, at least 3, or at least 4 and/or not more than 10, not more than 8, not more than 6, not more than 4, not more than 3, or not more than 2 different groups of set point values for achieving that profile. Each temperature-time profile may have the same, or a different, number of groups of set point values than one or more other temperature-time profiles in the same, or a different, operating profile.

Each group of set point values may include at least one target value for each of one or more different microwave system parameters. As illustrated in FIG. 3, for example, set point group A 308a includes, among other things, set points/target values for microwave (MW) net power, water temperature, and convey speed. When the operating profile includes two or more groups of set point values, each group may have a target value for a microwave system parameter that is different than, or the same as, the target value for the same parameter in one or more of the other groups. In some cases, each group of set point values may include target values for the same microwave system parameters, or one or more groups may include target values for different microwave system parameters.

Examples of suitable microwave system parameters can include, but are not limited to, total net microwave power discharged, liquid temperature in the microwave heating chamber, liquid flow rate in the microwave heating chamber, convey line speed through the microwave heating chamber, net microwave power discharged (per launcher or pair of launchers), dwell time, liquid temperature in the preheating section, liquid flow rate in the preheating section, convey line speed in the preheating section, liquid temperature in the holding section, liquid flow rate in the holding section, convey line speed in the holding section, liquid temperature in the cooling section, liquid flow rate in the cooling section, convey line speed in the cooling section, overall convey line speed, and overall production rate. Example values (provided as broad, intermediate, and narrow ranges) for each of these parameters are summarized in Tables 1 (pasteurization) and 2 (sterilization), below. Values within one or more of the other ranges described herein may also be suitable.

TABLE 1

Example Ranges for Microwave System Parameters for Pasteurization

| Parameter | Broad Range | Intermediate Range | Narrow Range |
|---|---|---|---|
| Microwave Heating Section | | | |
| Liquid Temperature, ° C. | 55-105 | 60-95 | 75-90 |
| Liquid Flow Rate, gpm | 1-75 | 2-50 | 5-25 |
| Convey Speed, in/s | 0.25-6 | 0.5-5 | 1-3.5 |
| Total Net Power Discharged, kW | 20-300 | 50-250 | 75-150 |
| Net Power Discharged Per Launcher, kW | 5-75 | 10-60 | 15-50 |
| Dwell Time, s | 10-600 | 30-300 | 60-180 |
| Preheating Section | | | |
| Liquid Temperature, ° C. | 45-95 | 60-90 | 65-85 |
| Liquid Flow Rate, gpm | 1-30 | 2-25 | 5-20 |
| Convey Speed, in/s | 1-75 | 2-50 | 5-25 |
| Holding Section | | | |
| Liquid Temperature, ° C. | 65-110 | 75-100 | 80-95 |
| Liquid Flow Rate, gpm | 1-30 | 2-25 | 5-20 |
| Convey Speed, in/s | 0.25-6 | 0.5-5 | 1-3.5 |
| Cooling Section | | | |
| Liquid Temperature, ° C. | 30-65 | 35-60 | 40-55 |
| Liquid Flow Rate, gpm | 1-30 | 2-25 | 5-20 |
| Convey Speed, in/s | 0.25-6 | 0.5-5 | 1-3.5 |
| Overall | | | |
| Convey Line Speed, in/s | 0.25-6 | 0.5-5 | 1-3.5 |
| Production Rate, packages/hr | 5-100 | 10-50 | 15-45 |

TABLE 2

Example Ranges for Microwave System Parameters for Sterilization

| Parameter | Broad Range | Intermediate Range | Narrow Range |
|---|---|---|---|
| Microwave Heating Section | | | |
| Liquid Temperature, ° C. | 90-135 | 95-125 | 100-120 |
| Liquid Flow Rate, gpm | 1-75 | 2-50 | 5-25 |
| Convey Speed, in/s | 0.25-6 | 0.5-5 | 1-3.5 |
| Total Net Power Discharged, kW | 20-300 | 50-250 | 75-200 |
| Net Power Discharged Per Launcher, kW | 5-75 | 10-60 | 15-50 |
| Dwell Time, s | 10-600 | 30-300 | 60-180 |
| Preheating Section | | | |
| Liquid Temperature, ° C. | 45-95 | 60-90 | 65-85 |
| Liquid Flow Rate, gpm | 1-30 | 2-25 | 5-20 |
| Convey Speed, in/s | 1-75 | 2-50 | 5-25 |
| Holding Section | | | |
| Liquid Temperature, ° C. | 100-140 | 110-135 | 115-130 |
| Liquid Flow Rate, gpm | 1-30 | 2-25 | 5-20 |
| Convey Speed, in/s | 0.25-6 | 0.5-5 | 1-3.5 |
| Cooling Section | | | |
| Liquid Temperature, ° C. | 30-65 | 35-60 | 40-55 |
| Liquid Flow Rate, gpm | 1-30 | 2-25 | 5-20 |
| Convey Speed, in/s | 0.25-6 | 0.5-5 | 1-3.5 |
| Overall | | | |
| Convey Line Speed, in/s | 0.25-6 | 0.5-5 | 1-3.5 |
| Production Rate, packages/hr | 5-100 | 10-50 | 15-45 |

The specific form of each target value provided in a group of set point values can vary. For example, in some cases, the target value may be a single targeted value with or without an allowable deviation. This deviation can be, for example, a permissible variation from the target value expressed as a percentage of the target value and/or as an absolute difference. For example, a group of set point values may include a target value of 100° C. for the temperature of the liquid in the microwave heating chamber and may specify a permissible deviation of ±5° C. or ±5% of the set point value. When the permissible deviation is specified as a percentage of the set point value, it may be ± at least about 1%, 2%, 5%, 8%, 9%, 10%, 15%, or 20% of the set point value. Specific deviations expressed as an absolute difference depend on the specific parameter itself. For example and without limitation, deviations for temperature-related values (e.g., liquid temperatures in any of the sections) may have a permissible deviation of ± at least about 1, 2, 3, 5, or 8° C. Deviations for speed-related values (e.g., convey speed) may have a permissible deviation of ± at least about 0.01, 0.025, 0.05, 0.10, 0.25, or 0.50 in/s. Deviations for power-related values (e.g., total net power discharged or net power discharged per launcher) may have a permissible deviation of ± at least about 2, 5, 10, or 15 kW.

In other cases, the target value specified in a group of operating set points may be a range of values for a given parameter. Such ranges may or may not include an allowable deviation as described previously. In some cases, a range of values provided as the target value may encompass a desirable set point value and its permissible deviations. For example, a target value of 100° C.±5° C. (or ±5%) for the liquid temperature in the microwave heating chamber may be expressed in a group of operating set points as a target value for liquid temperature in the microwave heating chamber of 95° C. to 105° C.

Alternatively, or in addition, one or more groups of set point values in an operating profile may include a predetermined maximum value and/or a predetermined minimum value as a target value for one or more microwave system parameters. These maximum and minimum values may represent the highest and lowest values, respectively, for a given parameter that are permissible in order to maintain the final quality of the foodstuff and/or its requisite level of pasteurization or sterilization.

Minimum and maximum values related to the target level of pasteurization or sterilization may include, for example, minimum total net microwave power discharged, minimum liquid temperature in the microwave heating chamber, maximum convey line speed through the microwave heating chamber, minimum net microwave power discharged (per launcher or pair of launchers), minimum liquid temperature in the preheating section, maximum convey line speed in the preheating section, minimum liquid temperature in the holding section, maximum convey line speed in the holding section, and maximum overall convey line speed. In some cases, exceeding these maximums or operating below these minimums may result in articles that fail to achieve the desired level of pasteurization or sterilization. Minimum and maximum values related to the overall quality of the final product may include, for example, maximum total net microwave power discharged, minimum convey line speed through the microwave heating chamber, maximum net microwave power discharged (per launcher or pair of launchers), maximum convey line speed in the holding section, and minimum overall convey line speed. Exemplary minimum and maximum target values for several of these parameters are summarized in Tables 1 and 2.

Each group of set point values in an operating profile may include a single target value for each microwave system parameter, or it may include two or more target values. When the group of set points includes two or more target values, one or more of the values may be listed as being more important than one or more of the others. Typically, a single group of set point values may not include more than three different target values for a single parameter. For example, a group of set point values may include a single targeted value (e.g., a total net power discharged of 75 kW) with or without an allowable deviation (e.g., ±5 kW), along with a predetermined maximum (e.g., 100 kW) and a predetermined minimum (e.g., 50 kW). These are intended to be illustrative values and are not necessarily limiting.

In some cases, the target values provided in the operating profile may be "point," or static values, while, in other case, one or more of the target values may change with time. When the target value or values change with time, the change may be step-wise, such that the value of the target value changes at a given time or times during the process and then remains generally constant until the next change, or it may be continuous, so that the target value follows a line or smooth curve as a function of process time.

The microwave system parameters listed previously are those which tend to be directly controlled during the operation of the microwave heating system. In some cases, the operating profile may also include target values, or ranges of target values, for one or more other microwave system parameters that may not be as easily controllable or measurable, but that may still be part of achieving the desired level of pasteurization or sterilization. Examples of such "indirect" parameters can include, but are not limited to, minimum article temperature, maximum temperature difference between hot and cold spots in a single article, maximum temperature difference between hot and cold spots amongst articles in a single carrier, article residence time in the heating zone, and combinations thereof. Tables 3 (pasteurization) and 4 (sterilization), below, provides broad, intermediate, and narrow ranges of possible values for each of the additional parameters listed above.

TABLE 3

Example Ranges of Value for Indirect Parameters (Pasteurization)

| Parameter | Broad Range | Intermediate Range | Narrow Range |
| --- | --- | --- | --- |
| Minimum Article Temperature, ° C. | 70-120 | 80-115 | 85-110 |
| Maximum Article Temperature, ° C. | 100-130 | 95-125 | 90-120 |
| Maximum Δ T per article, ° C. | 1-10 | 2-8 | 3-5 |
| Maximum Δ T per carrier, ° C. | 1-10 | 2-8 | 3-5 |
| Article Residence Time, min | 0.5-10 | 1-8 | 2-5 |

TABLE 4

Example Ranges of Value for Indirect Parameters (Sterilization)

| Parameter | Broad Range | Intermediate Range | Narrow Range |
| --- | --- | --- | --- |
| Minimum Article Temperature, ° C. | 120-140 | 121-135 | 122-130 |
| Maximum Article Temperature, ° C. | 135-150 | 130-145 | 125-140 |
| Maximum Δ T per article, ° C. | 1-10 | 2-8 | 3-5 |
| Maximum Δ T per carrier, ° C. | 1-10 | 2-8 | 3-5 |
| Article Residence Time, min | 0.5-10 | 1-8 | 2-5 |

Although the parameters in Tables 3 and 4, above may not necessarily be directly used as inputs to the control system of the microwave heating system, one or more groups of set point values in an operating profile may include desirable ranges for one or more of these indirect parameters as well.

Overall, the groups of set point values are selected to achieve a desired temperature-time profile that, when followed, will achieve a target $F_0$ for the articles being heated. In some cases when all or a portion of the operating profile has been approved by a governmental regulatory agency, articles produced according to the operating profile may be in compliance with applicable food safety standards, although the specific procedure and approvals may vary by country or region.

Figure 4:
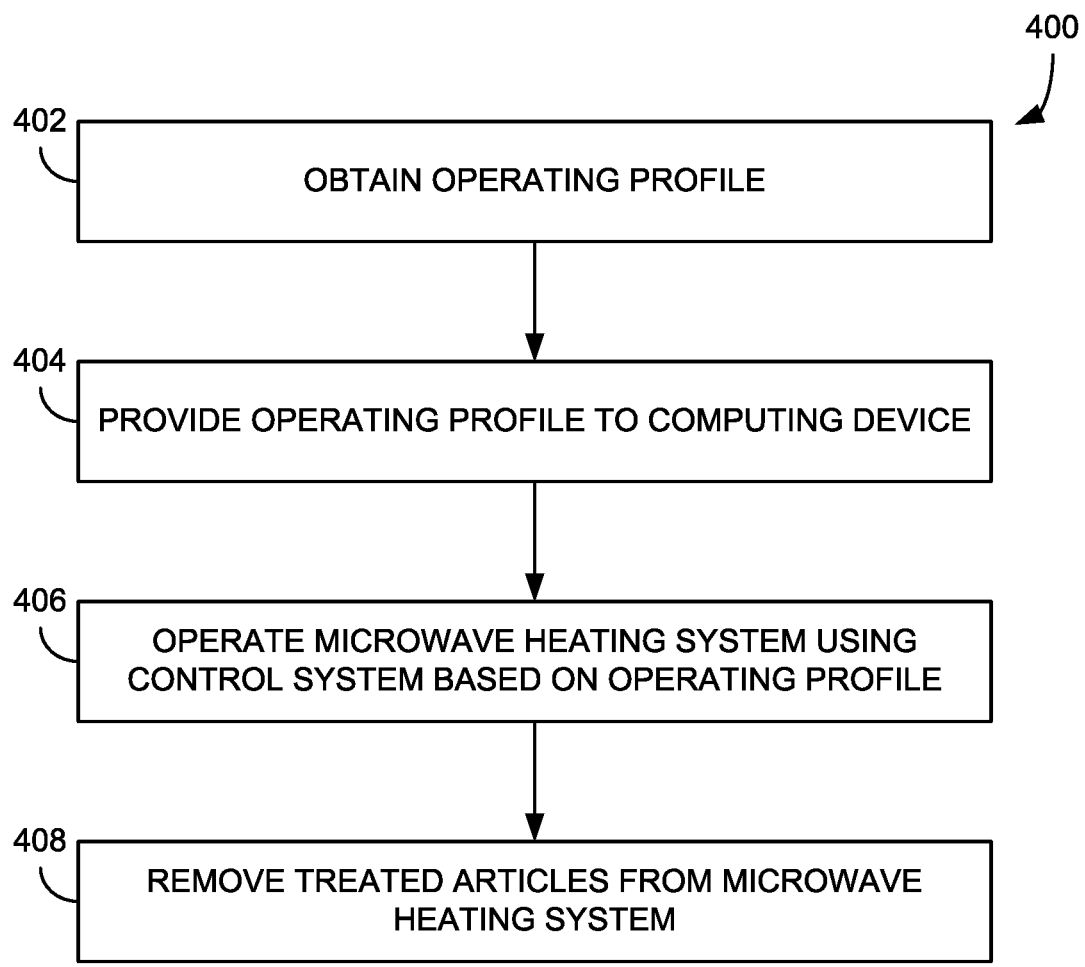
FIG. 4 is a flow chart illustrating a method for pasteurizing or sterilizing articles using a microwave heating system according to implementations of the present disclosure.

Turning now to FIG. 4, below, the main steps of a method 400 for pasteurizing or sterilizing articles using a microwave heating system according to implementations of the present disclosure is provided.

As shown in FIG. 4, the process begins with the step of obtaining an operating profile (operation 402). The operating profile can be in any suitable form, including an electronic form such as, for example, a spreadsheet or database. It may be saved locally on a computer or memory device, or saved in a central location accessible by one or more remote users. In other cases, the operating profile may be in printed form, such as in a table or other similar format. A single operating profile may be in both electronic and printed forms.

In some cases, the operating profile may be obtained by gathering empirical data from one or more process runs where the same (or similar) articles are pasteurized or sterilized using the same, or a different, microwave heating system. During these runs, values for various microwave system parameters may be measured or calculated, and the resulting data may be correlated to create the operating profile. Each profile may be composed of data from at least one, at least two, at least three, at least four, or five or more process runs operated under the same or different conditions. In some cases, these preliminary runs may be conducted by the same person or party using the operating profile, while, in other cases, another person or party may perform these preliminary runs in order to create an operating profile for use by another person or party. When two or more parties are involved, the parties may be part of the same organization (e.g., R&D department and operations department) or the parties may be part of different organizations.

As shown in FIG. 4, once obtained, all or part of the information in the operating profile may be provided to a computing device (operation 404). Typically, the computing device is a control system or is associated with a control system of the microwave heating system. In some cases, the computing device may be directly connected to the control system, such as, for example, a process logic controller (PLC), while, in other cases, the computing device may be an auxiliary computer into which data is entered and which outputs at least a portion of the data for use by the PLC or other controller. In some cases when an auxiliary computer is used, the output data may be directly transmitted to the control system, or it may be provided in printed or electronic format for input into the PLC by an operator.

When the operating profile includes two or more groups of set point values (and, optionally, two or more temperature-time profiles), providing the operating profile may also include selecting an initial group of set point values on which to operate the system. This initial group of set point values may have already been entered into the computer and are accessible by the user. This selection may be done manually during or after the entry of the operating profile into the computer or it may be done automatically by the computer or PLC. In some cases, the step of providing the operating profile to the computing device may include providing multiple operating profiles into the computing device at one time and the selection of the initial group of set point values may be chosen from amongst groups of set point values in different operating profiles at a later time after the profiles have been entered.

As shown in FIG. 4, above, once a group of set point values has been selected, the microwave heating system can then be operated based on these values (operation 406). For example, the values of the operating profile which may be used by the control system as control set points for each of the applicable microwave system parameters. For example, if a selected group of set point values includes target values for net microwave power discharged, convey line speed through the microwave heating chamber, and liquid temperature in the preheating section, these values may be used by the control system as set point values for each of these parameters. Operation of the microwave heating system may be done directly by the computing device into which the operating profile was entered and the group of set point values selected, indirectly, such as, for example, by an operator, or any combination thereof.

Figure 5:
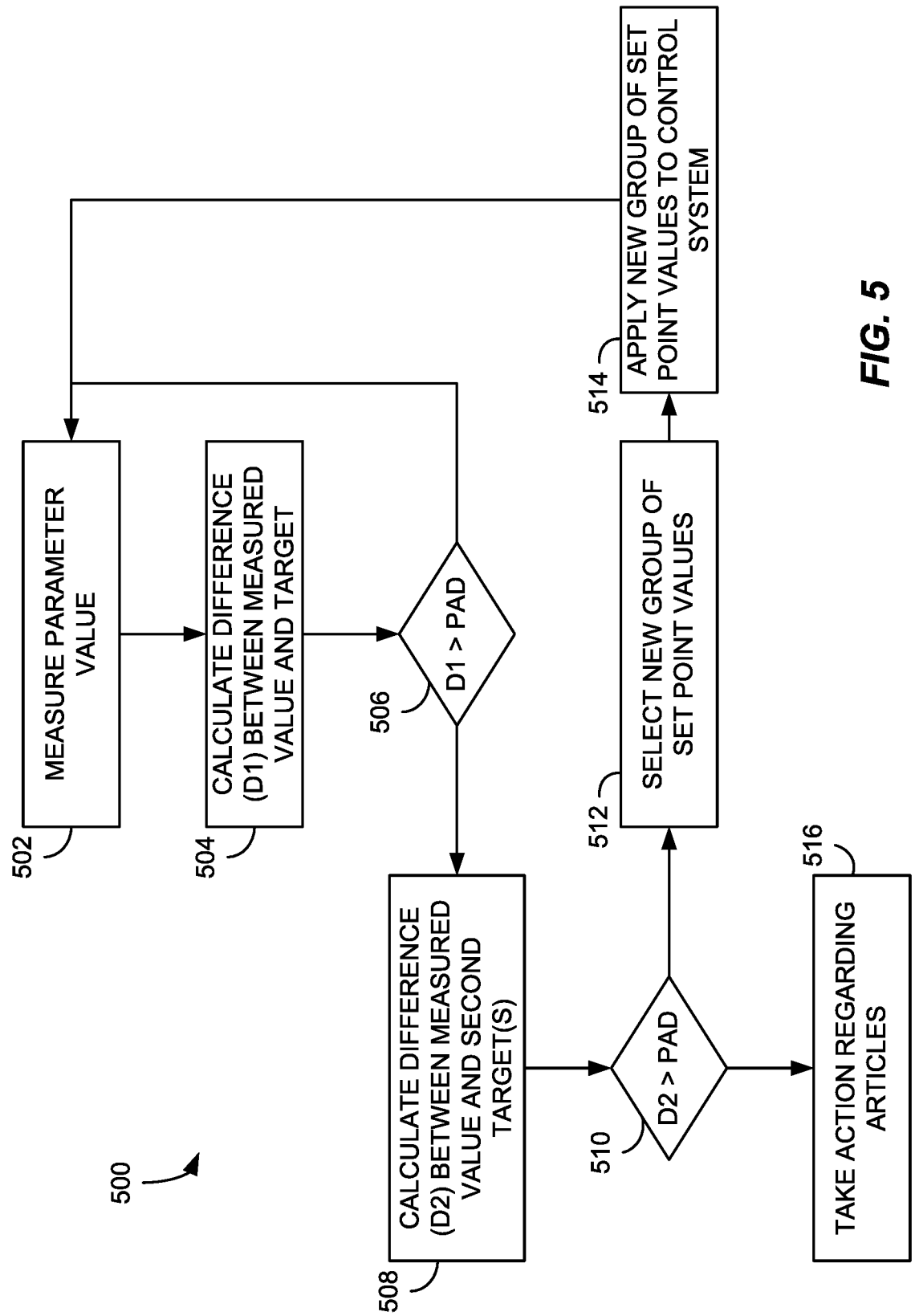
FIG. 5 is a flow chart illustrating a method of operating a microwave heating system using an operating profile.

Once entered, the operation of the microwave heating system is controlled using the control set points. Turning now to FIG. 5, a method 500 of operating a microwave heating system using an operating profile is provided.

As shown in FIG. 5, once the control set points have been entered, the actual value for the microwave system parameters for which a control set point has been set are measured while the system is operating (operation 502). For example, if the selected group of set point values included a target value for liquid temperature in the microwave heating chamber and the target value for set as the control set point, operation 502 would include measuring the actual value of the temperature of the liquid in the microwave heating chamber while the system is operating (e.g., while articles are being processed). Measurement of the actual values may include direct measurement and/or a calculation performed on a direct measurement to provide the measured value.

The measured value for each parameter is then compared with the control set point for that parameter to determine a difference (D1) (operation 504). This comparison may be done by the control system, but could be performed manually by an operator. Such a comparison can be a point comparison determined at a set interval, such as, for example, every 10 seconds, 30 seconds, 1 minute, 2 minutes, or 5 minutes. Or the comparison can done in "real-time" by continuously comparing the actual value and the control set point for a given parameter. A combination of these types of comparison could also be used.

The measured difference (D1) may then be compared with a predetermined allowable difference (PAD) to determine whether the measured difference is greater than or less than the PAD (operation 506). In some cases, the PAD may be calculated by finding the difference between an absolute maximum value which may not be exceeded and the control set point. In other cases, the PAD may be calculated by finding the difference between the control set point and an absolute minimum value below which the actual value for the microwave system parameter may not fall. In other cases, the PAD may be calculated from a maximum allowable deviation from the set point, which may be expressed as an absolute deviation (e.g., ±10° C.) or as a percentage of the set point (e.g., ±10% of the set point). The PAD can include an absolute value (e.g., ±50 kW) or it may be positive or negative, indicating values higher or lower than the control set point (e.g., −1 in/s or +20° C.).

As long as the difference (D1) between the measured value and the control set point value (D1) for the microwave system parameter are less than the PAD, the system continues to operate according to the selected group of set point values (i.e., the system returns to operation 502). In some cases, the difference between D1 and the PAD may result in various adjustments to the system itself (e.g., opening a valve, adding more cooling water, adjusting generator output, or starting, changing the speed of, or stopping a convey line). Such adjustments are in line with typical control system operation, but do not result in changing the control set points and no action is taken with respect to the articles except continuing to process the articles according to the originally-selected control set points.

If, however, during operation of the microwave heating system, the difference (D1) determined by comparing the measured value of a microwave system parameter with its control set point value (D1) exceeds the predetermined allowable difference (PAD), then corrective or other action may be taken with respect to the microwave heating system and/or the articles undergoing processing. In the past, these types of deviations typically meant that the articles that had been exposed to the undesirable operating conditions had to be disposed of, which not resulted in the articles being wasted, but also increased the cost of operating and lost time due to the shutting down and restarting of the system.

However, methods of the present disclosure in which an operating profile is used to control the microwave heating system may permit these process deviations to be "cleared," by adjusting the control set points of the system so that the "out-of-range" value falls within a new, acceptable range and the articles are able to achieve a desirable level of pasteurization or sterilization.

Referring again to FIG. 5, when D1 exceeds the PAD, the deviation can be "cleared," by next comparing the measured value for the microwave system parameter with other target values for the same microwave system parameter provided in other groups of set point values within the operating profile (operation 508). For example, if the difference between the actual measured value and the set point value for the liquid temperature in the microwave heating chamber in a first group of set point values exceeded the PAD, then the actual measured value for the liquid temperature in the microwave heating chamber could then be compared to other set point values for this parameter in one or more other groups of set point values within the operating profile. Each comparison between the measured value and other target values in other groups of set point values results in a second difference (D2).

Each second difference (D2) is then compared with the PAD to determine if any of the new differences (D2) are lower than the PAD (operation 510). Where this comparison step includes comparing the measured value of the parameter with the target value for that parameter in two or more different groups of set point values, there will be two or more second differences (D2) determined. Each of the new differences then are compared with the PAD to determine if any of the new differences (D2) are lower than the PAD.

When at least one of the new differences (D2) is lower than the PAD, the new group of set point values may be selected for use as a new set of control points for operating the system (operation 512). When two or more of the new differences (D2) are less than the PAD, one of the two groups of set point values including these target values may be chosen for use as the new control set points. In some cases, the group of set point values including the target value with the smallest difference from the measured value for the microwave system parameter (e.g., smallest D2) may be selected. In some cases, the group of set point values with a larger difference D2 may be chosen because, for example, it offers some additional advantage, such as increased production rate, shortened production time, or energy savings. In some cases, the control system may require the operator to choose which groups of set point values are used, while, in other cases, no choice may be given and the control system may automatically select one of the new groups of set point values.

The target value for the microwave system parameter in the new group of set point values will be closer to the measured value for the microwave system parameter, which was "out-of-range" with the previous target value. This effectively brings the deviation "into range," by changing the group of set point values used to operate the system. The measured value for the microwave system parameter is no longer out-of-range in the newly-selected group of set points. Once selected, the new group of set point values are optionally entered into or otherwise provided to the computer or control system (if not done already) and these set point values are then selected as the new control set points (operation 514). The microwave heating system can adjust to its new operating parameters, and the system can now be controlled according to the new group of control set points. The steps of measuring and adjusting as described above continue with the new control set points as the system continues to operate.

As an example, if a microwave heating system was operating with an operating profile using a group of set point values that included a target value for the liquid in the microwave heating chamber of 85° C., and the actual temperature of the liquid in the microwave heating chamber dropped to 70° C. during some point of the processing run, the difference between the set point value and the measured value at that point would be 15° C. If the operating profile specified a PAD for liquid temperature in the microwave heating chamber of 10° C., this measured difference (D1) would be "out-of-range" for the initial group of set point values on which the system was operating.

In order to address this deviation, the "out-of-range" value (e.g., 70° C.) for the temperature of the liquid in the microwave heating chamber could be compared with the target values for liquid temperature in the microwave heating chamber in one or more other groups of set point values within the same or a different operating profile. These other groups may be designed to achieve the same, or a different, temperature-time profile, which itself may be selected to achieve the same, or different, target $F_0$ value as the initial group of set point values and initial temperature-time profile. When the out-of-range measured value (e.g., 70° C.) is compared with the target values for the same parameter (e.g., liquid temperature in the microwave heating chamber) in each of the other groups of set point values, a difference (D2) is determined for each. Each of these differences (D2) is then compared with the PAD. If any of these individual differences are less than the PAD, then that group of set point values (including the target value that resulted in the smaller difference) can be selected as the new group of set point values on which to operate the system.

In the above example, the measured value for the temperature of the liquid in the microwave heating chamber of 70° C. can be compared to the target value for the temperature of the liquid in the microwave heating chamber in several other groups of set points. These groups may also have target values for other parameters (e.g., net power discharged, convey speed in the microwave heating chamber, etc.), which can be the same as or different than the target value for these parameters in the original group. For example, one group of set point values, referred to as Group B, may have a target value for the temperature of the liquid in the microwave heating chamber of 95° C., and another group, Group C, may have a target value for the same parameter of, for example, 65° C. Thus, the difference (D2) between the measured value of 70° C. and the target value in Group B is 25° C. and the difference (D2) between the measured value of 70° C. and the target value in Group C is 5° C.

If, in this example, the predetermined allowable difference is 10° C., Group C would be selected as the new group of set point values, since the difference between the target value for the temperature of the liquid in the microwave heating chamber and the measured value for this temperature of 5° C. (D2) is less than the predetermined allowable difference of 10° C. Group B would not be selected as the new group of set point values, since the difference between the target value for the temperature of the liquid in the microwave heating chamber in this group of set point values and the measured value for this temperature of 25° C. (D2) is more than the predetermined allowable difference of 10° C.

After selecting Group C as the new group of set point values, the set point values in this group would be used by the control system as the new control set points, and the operation of the microwave heating system can be adjusted as needed to meet the set point values. In some cases, this can include changing at least one other set point value for one or more other microwave system parameters, but may or may not require the other control set points to change. For example, when the new set point of 65° C. for the liquid temperature in the microwave heating chamber is entered as a new control set point in the control system, this may result in the control set points for one or more other microwave system parameters to change as well. Or, one or more control set points may stay the same. Then, the microwave heating system can continue its operation as outlined above. If another deviation occurs, the above process may be repeated as necessary.

Referring back to FIG. 5, in some cases, none of the new differences (D2) will be lower than the predetermined allowable difference. This means that the deviation cannot be cleared, as the operating profiles does not include any sets of conditions that could bring the "out-of-range" value into an acceptable range so that the articles could still reach the target level of pasteurization or sterilization. As shown in FIG. 5, this results in an action being taken with respect to the articles (operation 516). Such actions might include stopping the run, removing and disposing of the articles, rerunning the articles, or combinations thereof.

Turning back to FIG. 4, after operating the system according to the operating profile, the pasteurized or sterilized articles may be removed from the microwave heating system (operation 408). Prior to doing so, the articles may optionally be passed through holding and/or cooling sections, as described previously. In some cases, at least a portion of the operating profile may include target values for various parameters associated with these sections, such as, for example, liquid temperatures, convey speeds, etc. The articles removed from the microwave heating system may have achieved the target $F_0$ value and can have an $F_0$ value that is, for example, greater than or equal to the target value. In some cases, the actual $F_0$ value of the pasteurized or sterilized articles may be at least about 10, at least about 20, at least about 30, at least about 40, at least about 50, at least about 60, at least about 70, at least about 80, at least about 90, or more percent higher than the target $F_0$ value. The actual $F_0$ value achieved by a group of articles processed in a microwave heating system can be measured by numerically integrating the area under the actual temperature-time curve that the articles were at or above a minimum threshold temperature. As discussed previously, this minimum threshold temperature depends on whether the articles are being pasteurized or sterilized.

Additionally, in some cases, the microwave heating system may also be configured to store measured values for one or more microwave system parameters obtained during the processing of articles in one or more runs. This data may be stored in accordance with applicable regulatory procedures, or it may be used to create a new temperature-time profile, a new operating profile, or a new group of set point values.

Alternatively, or in addition, the measured values of microwave system parameters generated during one or more prior process runs may be used to evaluate data from a more recent process run and determine whether or not the most recent process run met certain criteria such as, for example, a certain temperature-time profile or a specific target $F_0$. In general, this can be done by comparing the values for one or more microwave system parameters measured during a given process run with an operating profile including one or more groups of set point values that have been selected to achieve a desired temperature-time profile and/or target $F_0$ value. In some cases, this method can be done after a processing run is complete and can include comparing one or more actual values for at least one microwave system parameter with the target values for that parameter in one or more groups of set point values in at least one operating profile. In some cases, multiple groups of set point values in two or more different operating profiles may be used for this comparison. This use of an operating profile for pasteurizing or sterilizing articles in a microwave heating system may be useful for R&D or pilot-plant scale up purposes, but may also have various uses in a commercial-scale facility.

Figure 6:
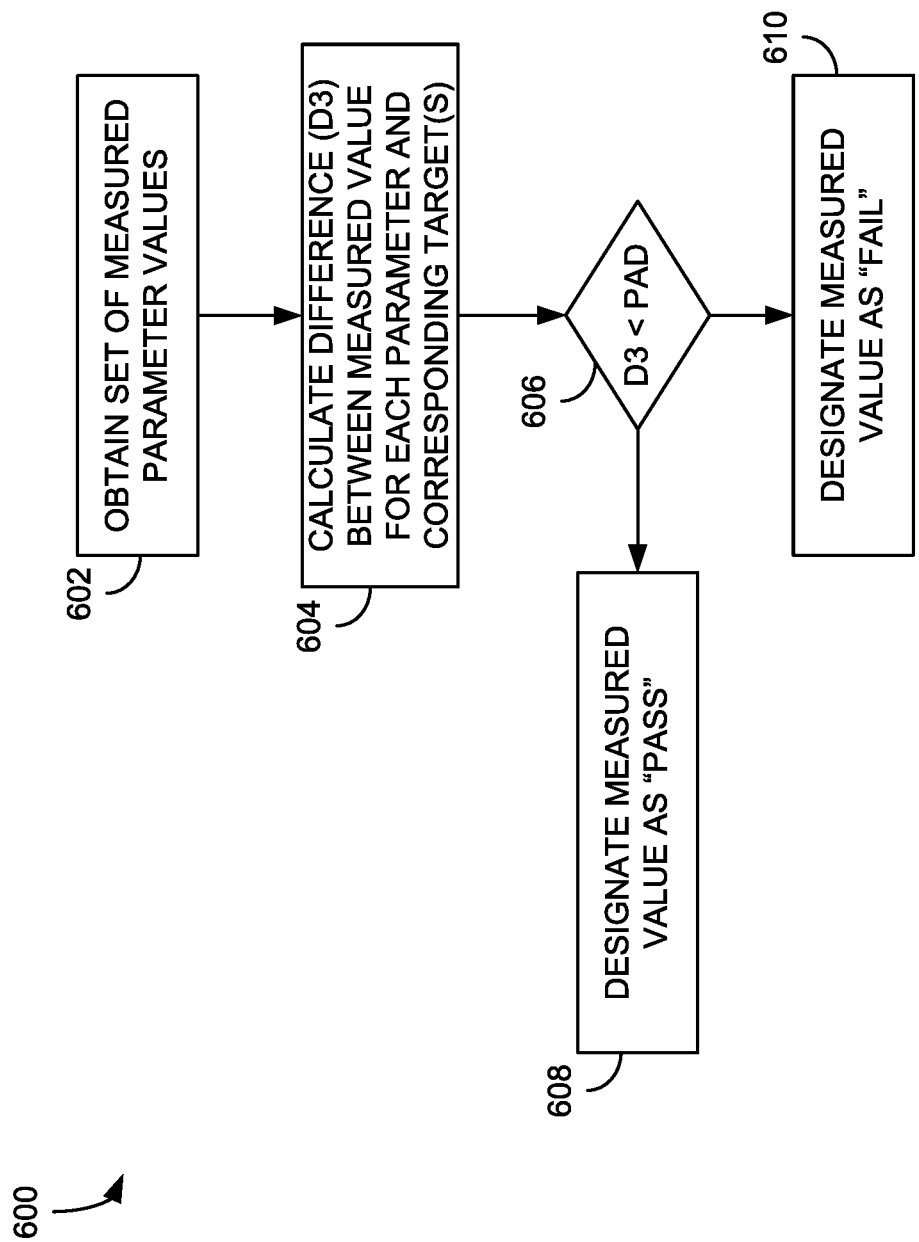
FIG. 6 is a flow chart illustrating a method of using an operating profile after a process run has been completed.

FIG. 6 is a method 600 of using an operating profile after a process run has been completed. As illustrated, a set of measured values for one or more microwave system parameters may be obtained while a group of articles is being heated in a microwave heating system (operation 602). After at least a portion, or all, of the process run has been completed, measured values for the microwave system parameter collected during the run can be compared to one or more target values for the same parameter in one or more groups of set point values in an operating profile (operation 604). In some cases, a measured value may be compared to two or more target values for the same parameter present in two or more different groups of set point values in order to determine several differences. Each comparison of a measured value to each target value results in a difference (D3). The groups of set point values may be selected to achieve the same or a different temperature-time profile and may be present in the same or a different operating profile.

If the difference (D3) between a measured value and each corresponding target value for a given microwave system parameter is less than a predetermined allowable difference (PAD), then the measured value can be said to "pass" (operations 606, 608). Alternatively, if the difference (D3) between the measured value and a target value for a given microwave system parameter is greater than the predetermined allowable difference, then the measured value can be said to "fail" (operation 610). Depending on the measured value for the parameter and the target values in each group of set points, a single measured value can "pass" when compared with one or more groups of set point values and "fail" with one or more other groups.

These pass/fail analyses can be performed for a single microwave system parameter across several groups of set point values to determine several differences, and the step may optionally be repeated with one or more other microwave system parameters for which actual values were measured during the run. In other words, the general process illustrated in operation 602-610 of FIG. 6 may be repeated for each of a set of microwave system parameters.

Figure 7:
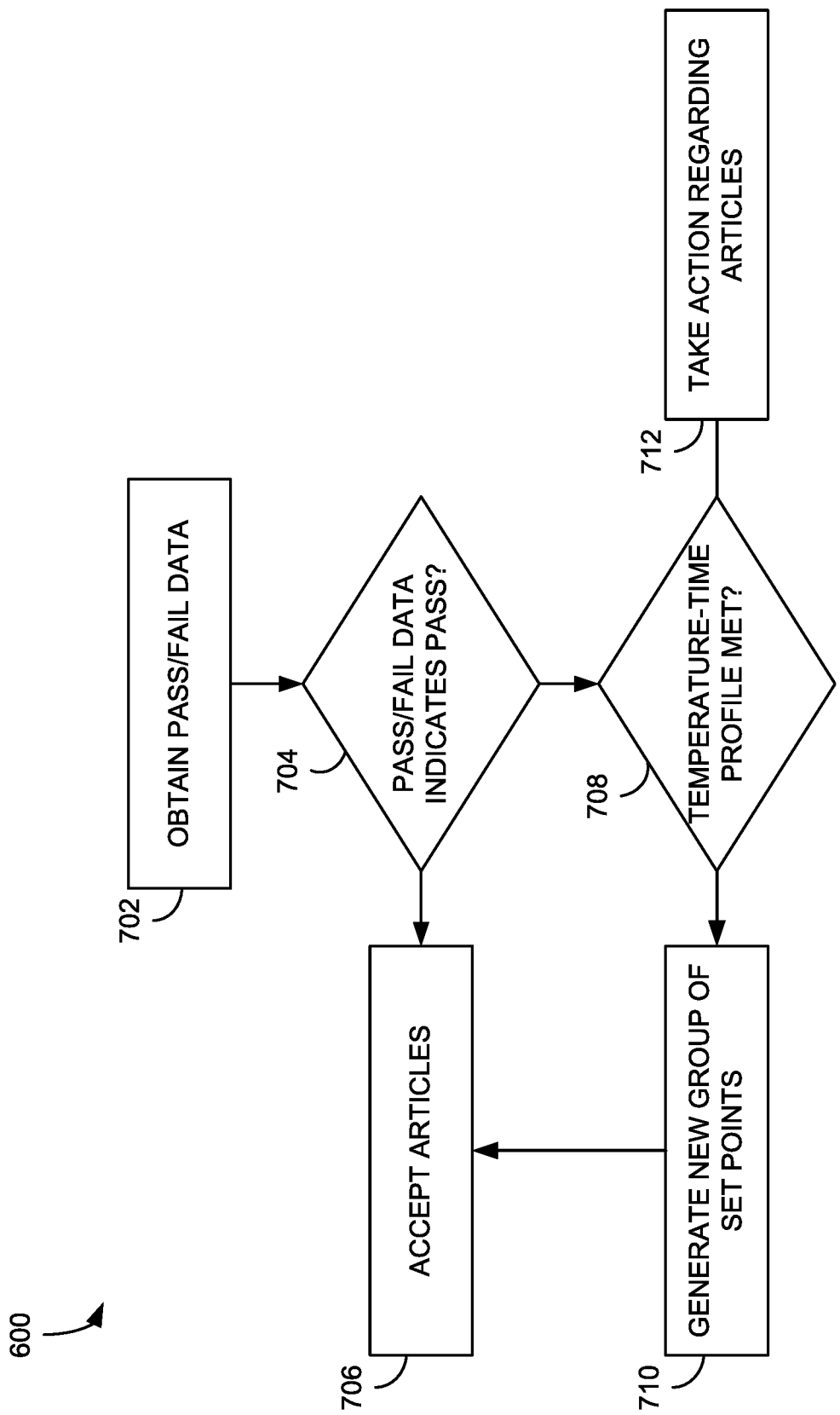
FIG. 7 is a flow chart illustrating a method of analyzing pass/fail results for a given process run.

Once all comparisons have been made an analysis of the pass/fail results can be used to determine which, if any, of the existing groups of set point values satisfactorily encompasses the measured data from the process run. For example, FIG. 7 illustrates an example method 700 of analyzing pass/fail results for a given process run. As indicated in FIG. 7, the method 700 begins with obtaining pass/fail data (operation 702). As discussed above in the context of FIG. 6, the pass/fail data generally includes a list of system parameters and a corresponding indication of whether measured values obtained during the process run were within a PAD of set points for the system parameters (a "pass") or fell outside the PAD (a "fail"). The pass/fail data may include such information for multiple groups of set points.

At operation 704, an initial analysis is conducted to determine whether the measured values for the process run "passed" with respect to each set point requirements for a group of set points (operation 704). In other words, the pass/fail data is evaluated to determine whether the process run was completed such that all system parameters during the process run were within known ranges for producing acceptable articles. If so, the articles are accepted (operation 706).

If no existing groups of set point values satisfactorily encompass the measured data, the temperature-time curve of the process run may be analyzed to determine if the articles achieved a desired $F_0$ value (operation 708). If so, the measured data can be correlated to form a new group of set point values (operation 710), a new temperature-time profile, and/or a new operating profile. In other words, if the measured values obtained during the process run did not fall within range of set points for established groups of set points but nevertheless achieved satisfactory sterilization or pasteurization of the article, the measured values of the process run may be stored as a new group of operating set points for use in subsequent process runs. If, on the other hand, the temperature-time profile for the article is not met, further action may be taken regarding the articles including, without limitation, disposing of the articles or rerunning the articles (operation 712).

Additionally, or in the alternative, the step of comparing the measured data set with a target value may include comparing the actual temperature-time profile generated during the processing run with at least one target temperature-time profile present in an operating profile. In some cases, the actual temperature-time profile may be compared with two or more temperature-time profiles in the same, or different, operating profiles. This comparison can include, for example, calculating maximum deviations of the actual temperature-time profile and the target profile and comparing these deviations with a maximum allowable deviation set forth in the operating profile. Alternatively, this comparison can include calculating the $F_0$ value based on the actual temperature-time profile and comparing it with the target $F_0$ value inherent one or more temperature-time profiles or target $F_0$ values expressly listed in the temperature-time profile. In certain implementations, for example, the actual temperature-time profile may deviate from the target temperature-time profile by not more than about 50%, not more than about 45%, not more than about 40%, not more than about 35%, not more than about 30%, not more than about 25%, not more than about 20%, not more than about 15%, not more than about 10%, not more than about 5%, not more than about 2%, or not more than about 1% over all or a portion of the heating steps.

As noted above, based on the differences determined by comparing the actual data from a completed process run with the groups of set point values, temperature-time profiles, and/or target $F_0$ values in one or more operating profiles, one or more actions can be taken with regard to the microwave heating system. In some cases, the articles may be discarded or rerun, if it has been determined that the articles have not achieved the desired level of pasteurization or sterilization. However, if the articles have achieved the desired treatment level, the pasteurized or sterilized articles can be transported to further processing, storage, and/or sale. Alternatively, one or more adjustments can be made to the physical configuration of the microwave system, and/or to its overall operation. Further, the differences may result in changes to an existing operating profile, or may result in a new group of set point values, temperature-time profile, or operating profile being created.

Microwave heating systems of the present disclosure can be commercial-scale heating systems capable of processing a large volume of articles in a relatively short time. In contrast to conventional retorts and other small-scale systems that utilize microwave energy to heat a plurality of articles, microwave heating systems as described herein can be configured to achieve an overall production rate of at least about 5 packages per minute, at least about 10 packages per minute, at least about 15 packages per minute per convey line, at least about 20 packages per minute per convey line, at least about 25 packages per minute per convey line, or at least about 30 packages per minute per convey line, measured as described in U.S. Pat. No. 9,357,590, which is incorporated herein by reference.

Figure 8:
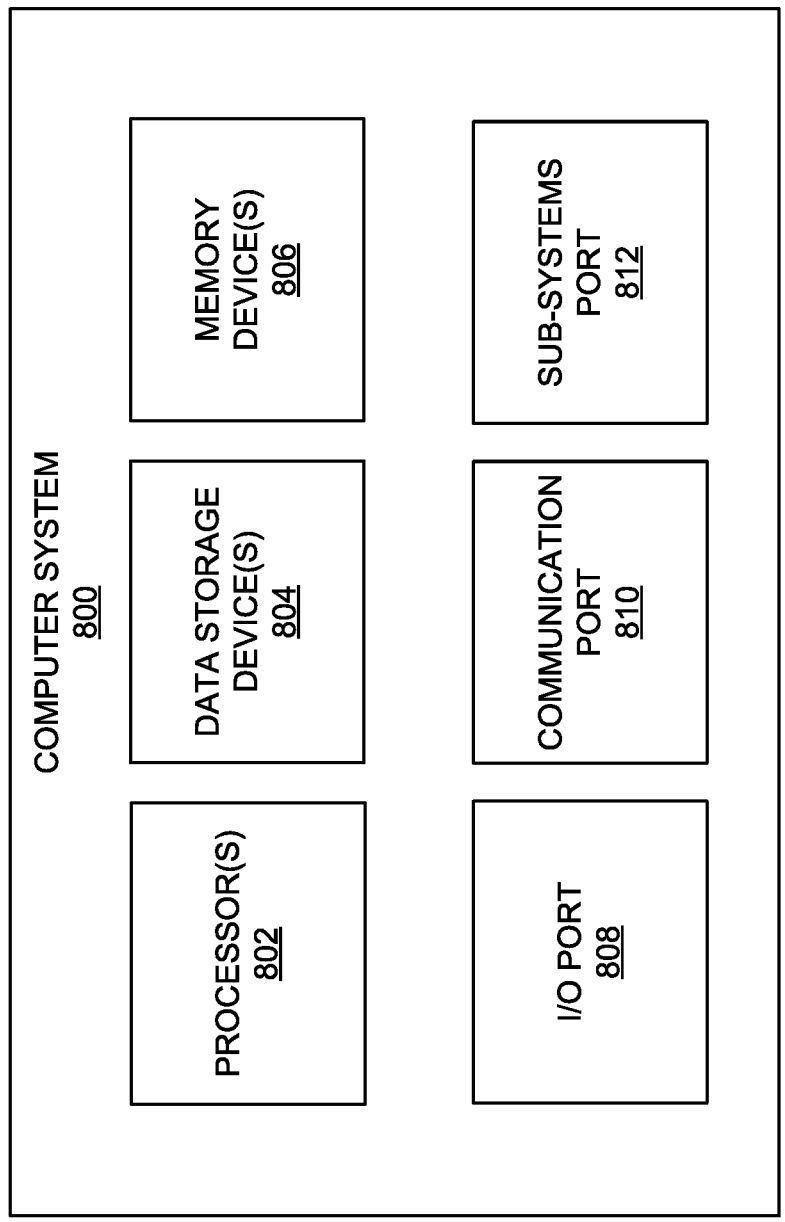
FIG. 8 is a block diagram illustrating a computer/control system as may be included in the microwave heating system of FIG. 1A.

Referring to FIG. 8, a schematic illustration of an example computing system 800 having one or more computing units that may implement various systems, processes, and methods discussed herein is provided. For example, the example computing system 800 may correspond to, among other things, the control system 150 or (a computing device in communication with or otherwise capable of interacting with the control system 150) of the microwave heating system 100 of FIG. 1A. It will be appreciated that specific implementations of these devices may be of differing possible specific computing architectures not all of which are specifically discussed herein but will be understood by those of ordinary skill in the art.

The computer system 800 may be a computing system capable of executing a computer program product to execute a computer process. Data and program files may be input to computer system 800, which reads the files and executes the programs therein. Some of the elements of the computer system 800 are shown in FIG. 8, including one or more hardware processors 802, one or more data storage devices 804, one or more memory devices 808, and/or one or more ports 808-812. Additionally, other elements that will be recognized by those skilled in the art may be included in the computing system 800 but are not explicitly depicted in FIG. 8 or discussed further herein. Various elements of the computer system 800 may communicate with one another by way of one or more communication buses, point-to-point communication paths, or other communication means not explicitly depicted in FIG. 8.

The processor 802 may include, for example, a central processing unit (CPU), a microprocessor, a microcontroller, a digital signal processor (DSP), and/or one or more internal levels of cache. There may be one or more processors 802, such that the processor 802 comprises a single central-processing unit, or a plurality of processing units capable of executing instructions and performing operations in parallel with each other, commonly referred to as a parallel processing environment.

The computer system 800 may be a conventional computer, a distributed computer, or any other type of computer, such as one or more external computers made available via a cloud computing architecture. The presently described technology is optionally implemented in software stored on data storage device(s) 804, stored on memory device(s) 806, and/or communicated via one or more of the ports 808-812, thereby transforming the computer system 800 in FIG. 8 to a special purpose machine for implementing the operations described herein. Examples of the computer system 800 include personal computers, terminals, workstations, mobile phones, tablets, laptops, personal computers, multimedia consoles, gaming consoles, set top boxes, and the like.

One or more data storage devices 804 may include any non-volatile data storage device capable of storing data generated or employed within the computing system 800, such as computer executable instructions for performing a computer process, which may include instructions of both application programs and an operating system (OS) that manages the various components of the computing system 800. Data storage devices 804 may include, without limitation, magnetic disk drives, optical disk drives, solid state drives (SSDs), flash drives, and the like. Data storage devices 804 may include removable data storage media, non-removable data storage media, and/or external storage devices made available via wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 804 and/or the memory devices 806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 800 includes one or more ports, such as an input/output (I/O) port 808, a communication port 810, and a sub-systems port 812, for communicating with other computing, network, or similar devices. It will be appreciated that the ports 808-812 may be combined or separate and that more or fewer ports may be included in the computer system 800.

The I/O port 808 may be connected to an I/O device, or other device, by which information is input to or output from the computing system 800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 800 via the I/O port 808. Similarly, the output devices may convert electrical signals received from the computing system 800 via the I/O port 808 into signals that may be sensed as output by a human, such as sound, light, and/or touch. The input device may be an alphanumeric input device, including alphanumeric and other keys for communicating information and/or command selections to the processor 802 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 800 via the I/O port 808. For example, an electrical signal generated within the computing system 800 may be converted to another type of signal, and/or vice-versa. In one implementation, the environment transducer devices sense characteristics or aspects of an environment local to or remote from the computing device 800, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 800, such as, physical movement of some object (e.g., a mechanical actuator), heating, or cooling of a substance, adding a chemical substance, and/or the like.

In one implementation, a communication port 810 is connected to a network by way of which the computer system 800 may receive network data useful in executing the methods and systems set out herein as well as transmitting information and network configuration changes determined thereby. Stated differently, the communication port 810 connects the computer system 800 to one or more communication interface devices configured to transmit and/or receive information between the computing system 800 and other devices by way of one or more wired or wireless communication networks or connections. Examples of such networks or connections include, without limitation, Universal Serial Bus (USB), Ethernet, WiFi, Bluetooth®, Near Field Communication (NFC), Long-Term Evolution (LTE), and so on. One or more such communication interface devices may be utilized via communication port 810 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 810 may communicate with an antenna for electromagnetic signal transmission and/or reception.

The computer system 800 may include a sub-systems port 812 for communicating with one or more sub-systems, to control an operation of the one or more sub-systems, and to exchange information between the computer system 800 and the one or more sub-systems. Examples of such sub-systems include, without limitation, imaging systems, radar, LIDAR, motor controllers and systems, battery controllers, fuel cell or other energy storage systems or controls, light systems, navigation systems, environment controls, entertainment systems, and the like.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Numerous examples are provided herein to enhance understanding of the present disclosure. A specific set of statements are provided as follows. Such statements are intended merely as examples of potential implementations of the present disclosure and should not be viewed as limiting the scope of the disclosure.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As generally used herein, the terms "about", "substantially", and "approximately" refer to an acceptable degree of error for the quantity measured, given the nature or precision of the measurement. Typical exemplary degrees of error may be within 20%, within 10%, or within 5% of a given value or range of values.

All numerical quantities stated herein are to be understood as being modified in all instances by the term "about" unless otherwise indicated. The numerical quantities disclosed herein are approximate and each numerical value is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding techniques. Notwithstanding the approximations of numerical quantities stated herein, the numerical quantities described in specific examples of actual measured values are reported as precisely as possible.

All numerical ranges stated herein include all sub-ranges subsumed therein. For example, ranges of "1 to 10" and "between 1 and 10" are intended to include all sub-ranges between and including the recited minimum value of 1 and the recited maximum value of 10.

All percentages and ratios are calculated by weight unless otherwise indicated. All percentages and ratios are calculated based on the total weight of the compound or composition unless otherwise indicated.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

It should be understood from the foregoing that, while particular implementations have been illustrated and described, various modifications can be made thereto without departing from the spirit and scope of the disclosure as will be apparent to those skilled in the art. Such changes and modifications are within the scope and teachings of this disclosure as defined in the claims appended thereto.

Numerous examples are provided herein to enhance understanding of the present disclosure. A specific set of statements are provided as follows. Such statements are intended merely as examples of potential implementations of the present disclosure and should not be viewed as limiting the scope of the disclosure.

Statement 1. A method for pasteurizing or sterilizing a plurality of articles in a liquid-filled microwave heating system, the method including: (a) obtaining an operating profile suitable for heating a first type of articles in said microwave heating system, wherein said operating profile includes at least one temperature-time profile selected to achieve a target $F_0$ value; and at least one group of set point values selected to achieve said temperature-time profile, wherein each group of set point values includes at least one target value for a system control parameter; (b) entering at least a portion of said operating profile into a computer associated with a control system for regulating the operation of said microwave heating system; (c) operating said microwave heating system based on said group of set point values, wherein operating includes passing a carrier loaded with a plurality of said first type of articles through a liquid-filled microwave heating chamber along a convey line, wherein said articles are submerged in a liquid medium during said passing, and, during at least a portion of said passing, discharging microwave energy into said microwave heating chamber, wherein at least a portion of said microwave energy is used to heat said articles, and wherein at least a portion of said passing and/or said heating is performed using said control system; and (d) removing pasteurized or sterilized articles from said microwave heating system, wherein said pasteurized or sterilized articles have achieved an $F_O$ value that is greater than or equal to said target $F_O$ value.

Statement 2. The method of statement 1, wherein said operating profile comprises a first temperature-time profile selected to achieve said target $F_O$ value, a first group of set point values, and a second group of set point values, wherein said first group of set point values includes a first target value for said system control parameter and said second group of set point values includes a second target value for said system control parameter.

Statement 3. The method of Statement 2, wherein said operating profile further includes a second temperature-time profile selected to achieve said target $F_O$ value.

Statement 4. The method of Statement 3, wherein said first group of set point values are selected to achieve said first temperature-time profile and said second group of set point values are selected to achieve said second temperature-time profile.

Statement 5. The method of Statement 2, wherein each of said first and said second groups of set point values are selected to achieve said first temperature-time profile, and wherein said first target value is different than said second target value.

Statement 6. The method of Statement 1, wherein said system control parameter is selected from the group consisting of total net microwave power discharged, liquid temperature in said microwave heating chamber, liquid flow rate in said microwave heating chamber, and convey speed of said carrier through said microwave heating chamber.

Statement 7. The method of Statement 6, wherein said system control parameter is total net microwave power discharged and said group of set point values includes at least one target value for total net microwave power discharged.

Statement 8. The method of Statement 7, wherein said target value for said total net microwave power discharged is in the range of from 25 kW to 250 kW.

Statement 9. The method of Statement 7, wherein said target value for total net microwave power discharged includes a minimum value for total net microwave power discharged and is at least 20 kW and/or wherein said target value for said total net microwave power discharged includes a maximum value for total net microwave power discharged and is not more than 300 kW.

Statement 10. The method of Statement 6, wherein said system control parameter is liquid temperature in said microwave heating chamber and said group of set point values includes at least one target value for the liquid temperature in said microwave heating chamber.

Statement 11. The method of Statement 10, wherein said target value for the liquid temperature in said microwave heating chamber is in the range of from 55° C. to 105° C. or in the range of from 95° C. to 125° C.

Statement 12. The method of Statement 10, wherein said target value for the liquid temperature in said microwave heating chamber is a minimum liquid temperature and is at least 40° C. or at least 90° C. and/or wherein said target value for the liquid temperature in said microwave heating chamber is a maximum liquid temperature and is not more than 95° C. or not more than 135° C.

Statement 13. The method of Statement 6, wherein said system control parameter is liquid flow rate in said microwave heating chamber and said group of set point values includes at least one target value for the liquid flow rate in said microwave heating chamber.

Statement 14. The method of Statement 13, wherein said target value for the liquid flow rate in said microwave heating chamber is in the range of from 2 to 50 gallons per minute (gpm) and/or wherein said target value for the liquid flow rate in said microwave heating chamber is a minimum flow rate and is at least 1 gpm and/or wherein said target value for liquid flow rate in said microwave heating chamber is a maximum flow rate and is not more than 75 gpm.

Statement 15. The method of Statement 6, wherein said system control parameter is convey speed through said microwave heating chamber and said group of set point values includes at least one target value for the convey speed through said microwave heating chamber.

Statement 16. The method of Statement 15, wherein said target value for the convey speed is in the range of from 0.50 to 5 inches per second (in/s) and/or wherein said target value for the convey speed is a minimum convey speed and is at least 0.25 in/s and/or wherein said target value for the convey speed is a maximum convey speed and is not more than 6 in/s.

Statement 17. The method of Statement 1, wherein said discharging is performed using at least two microwave launchers configured to emit microwave energy into said microwave heating chamber.

Statement 18. The method of Statement 17, wherein said microwave launchers are located on opposite sides of said microwave heating chamber.

Statement 19. The method of Statement 17, wherein said microwave launchers are located on the same side of said microwave heating chamber and are spaced apart from one another along the direction of travel of said carrier along said convey line, wherein said operating of step (c) includes passing said carrier past one of said microwave launchers and into a space between said launcher and an adjacent microwave launcher, wherein said carrier in held said space for a predetermined dwell time and said articles are not exposed to microwave energy during said dwell time, and wherein said system control parameter is selected from the group consisting of total net microwave power discharged, liquid temperature in said microwave heating chamber, liquid flow rate in said microwave heating chamber, convey speed of said carrier through said microwave heating chamber, and total dwell time.

Statement 20. The method of Statement 19, wherein said system control parameter is total dwell time and said group of set point values includes at least one target value for the total dwell time, wherein said target value for the total dwell time is in the range of from 30 seconds to 5 minutes and/or wherein said target value for the total dwell time is a minimum dwell time and is at least 10 seconds and/or wherein said target value for the total dwell time is a maximum dwell time and is not more than 10 minutes.

Statement 21. The method of Statement 1, wherein said operating further includes passing said carrier through a liquid-filled preheating section along a convey line prior to passing said carrier through said microwave heating chamber, wherein said articles are submerged in a warm liquid medium in said preheating section during said passing, and wherein said system control parameter is said selected from the group consisting of total net microwave power discharged, liquid temperature in said microwave heating chamber, liquid flow rate in said microwave heating chamber, convey speed of said carrier through said microwave heating chamber, liquid temperature in said preheating section, liquid flow rate in said preheating section, and convey speed of said carrier through said preheating section.

Statement 22. The method of Statement 21, wherein said system control parameter is liquid temperature in said preheating section and said group of set points includes at least one target value for the liquid temperature in said preheating section.

Statement 23. The method of Statement 22, wherein said target value for the liquid temperature in said preheating section is in the range of from 60° C. to 95° C.

Statement 24. The method of Statement 22, wherein said target value for the liquid temperature in said preheating section is a minimum liquid temperature and is at least 45° C. or wherein said target value for the liquid temperature in said preheating section is a maximum liquid temperature and is not more than 95° C.

Statement 25. The method of Statement 21, wherein said system control parameter is liquid flow rate in said preheating section and said group of set point values includes at least one target value for the liquid flow rate in said preheating section, wherein said target value for the liquid flow rate in said preheating section is in the range of from 2 to 50 gallons per minute (gpm) and/or said target value for the liquid flow rate in said preheating section is a minimum flow rate and is at least 1 gpm and/or said target value for liquid flow rate in said preheating section is a maximum flow rate and is not more than 75 gpm.

Statement 26. The method of Statement 21, wherein said system control parameter is convey speed through said preheating section and said group of set point values includes at least one target value for the convey speed through said preheating section, and wherein said target value for the convey speed through said preheating section is in the range of from 0.50 to 5 inches per second (in/s) and/or wherein said target value for the convey speed is a minimum convey speed and is at least 0.25 in/s and/or wherein said target value for the convey speed is a maximum convey speed and is not more than 6 in/s.

Statement 27. The method of Statement 1, wherein said operating of step (c) further includes passing said carrier through a liquid-filled holding section along a convey line subsequent to passing said carrier through said microwave heating chamber, wherein said articles are submerged in a heated liquid medium in said holding section during said passing, and wherein said system control parameter is selected from the group consisting of total net microwave power discharged, liquid temperature in said microwave heating chamber, liquid flow rate in said microwave heating chamber, convey speed of said carrier through said microwave heating chamber, liquid temperature in said holding section, liquid flow rate in said holding section, and convey speed of said carrier through said holding section.

Statement 28. The method of Statement 27, wherein said system control parameter is liquid temperature in said holding section and said group of set points includes at least one target value for the liquid temperature in said holding section.

Statement 29. The method of Statement 28, wherein said target value for the liquid temperature in said holding section is in the range of from 75° C. to 100° C. or in the range of from 110° C. to 135° C.

Statement 30. The method of Statement 28, wherein said target value for the liquid temperature in said holding section is a minimum liquid temperature and is at least 65° C. or is at least 100° C. and/or wherein said target value for the liquid temperature in said holding section is a maximum liquid temperature and is not more than 110° C. or not more than 140° C.

Statement 31. The method of Statement 27, wherein said system control parameter is liquid flow rate in said holding section and said group of set point values includes at least one target value for the liquid flow rate in said holding section, and wherein said target value for the liquid flow rate in said holding section is in the range of from 2 to 50 gallons per minute (gpm) and/or wherein said target value for the liquid flow rate in said holding section a minimum flow rate and is at least 1 gpm and/or wherein said target value for liquid flow rate in said holding section is a maximum flow rate and is not more than 75 gpm.

Statement 32. The method of Statement 27, wherein said system control parameter is convey speed through said holding section and said group of set point values includes at least one target value for the convey speed through said holding section, wherein said target value for the convey speed through said holding section is in the range of from 0.50 to 5 inches per second (in/s) and/or wherein said target value for the convey speed is a minimum convey speed and is at least 0.25 in/s and/or wherein said target value for the convey speed is a maximum convey speed and is not more than 6 in/s.

Statement 33. The method of Statement 1, wherein said operating of step (c) further includes passing said carrier through a liquid-filled cooling section along a convey line subsequent to passing said carrier through said microwave heating chamber, wherein said articles are submerged in a cool liquid medium in said cooling section during said passing, and wherein said system control parameter is selected from the group consisting of total net microwave power discharged, liquid temperature in said microwave heating chamber, liquid flow rate in said microwave heating chamber, convey speed of said carrier through said microwave heating chamber, liquid temperature in said cooling section, liquid flow rate in said cooling section, and convey speed of said carrier through said cooling section.

Statement 34. The method of Statement 33, wherein said system control parameter is liquid temperature in said cooling section and said group of set points includes at least one target value for the liquid temperature in said cooling section, wherein said target value for the liquid temperature in said cooling section is in the range of from 35° C. to 60° C. and/or wherein said target value for the liquid temperature in said cooling section is a minimum liquid temperature and is at least 30° C. and/or wherein said target value for the liquid temperature in said cooling section is a maximum liquid temperature and is not more than 65° C.

Statement 35. The method of Statement 33, wherein said system control parameter is liquid flow rate in said cooling section and said group of set point values includes at least one target value for the liquid flow rate in said cooling section, wherein said target value for the liquid flow rate in said cooling section is in the range of from 2 to 50 gallons per minute (gpm) or said target value for the liquid flow rate in said cooling section is a minimum flow rate and is at least 1 gpm and/or wherein said target value for liquid flow rate in said cooling section is a maximum flow rate and is not more than 75 gpm.

Statement 36. The method of Statement 33, wherein said system control parameter is convey speed through said cooling section and said group of set point values includes at least one target value for the convey speed in said cooling section, wherein said target value for the convey speed is in the range of from 0.50 to 5 inches per second (in/s) and/or wherein said target value for the convey speed is a minimum convey speed and is at least 0.25 in/s and/or wherein said target value for the convey speed is a maximum convey speed and is not more than 6 in/s.

Statement 37. The method of Statement 1, wherein said operating of step (c) further includes: (i) during at least a portion of the heating, measuring the value of said system control parameter to provide a measured value; (ii) comparing said measured value with said target value for said system control parameter in said group of set point values to determine a difference; (iii) comparing said difference with a predetermined allowable difference, wherein when said difference is less than said predetermined allowable difference, continuing to operate said microwave heating system, and when said difference is greater than said predetermined allowable difference, taking an action with regard to the system.

Statement 38. The method of Statement 37, wherein said action is selected from the group consisting of discarding said articles, rerunning said articles through said microwave heating system, increasing or decreasing the total net microwave power discharged, increasing or decreasing the liquid flow rate in said microwave heating chamber, increasing or decreasing the liquid temperature in said microwave heating chamber, or increasing or decreasing the convey speed of said carrier through said microwave heating chamber, or combinations of two or more thereof.

Statement 39. The method of Statement 1, wherein said obtaining includes heating a group of said first type of articles in said microwave heating system or another microwave heating system, measuring the values for one or more system control parameters during said heating to provide a set of measured values, and correlating said measured values to provide said operating profile.

Statement 40. The method of Statement 1, wherein said obtaining includes obtaining said heating profile from another party.

Statement 41. The method of Statement 1, further including obtaining another operating profile suitable for pasteurizing or sterilizing a second type of articles and repeating steps (b) through (e) with said another operating profile to pasteurize or sterilize a plurality of said second type of articles.

Statement 42. The method of Statement 1, wherein said microwave heating system has an overall production rate of at least 20 packages per minute.

Statement 43. A method for pasteurizing or sterilizing a plurality of articles in a liquid-filled microwave heating system, said method including: (a) obtaining an operating profile for said microwave heating system, wherein said operating profile includes at least one temperature-time profile for achieving a target $F_0$ value, and at least two groups of set point values, wherein each group of set point values includes at least one target value for a first system control parameter; (b) entering said operating profile into at least one computer associated with a control system for regulating the operation of said liquid-filled microwave heating system; (c) selecting a first group of set point values from said operating profile, wherein said first group of set point values includes a first target value for said first system control parameter, and wherein said first target value is used in said control system as an operating set point for said first system control parameter; (d) operating said microwave heating system according to said first group of set point values, wherein said operating includes: (i) passing a carrier loaded with a plurality of articles through a liquid-filled microwave heating chamber along a convey line, wherein said articles are submerged in a liquid medium during said passing; (ii) during at least a portion of said passing, discharging microwave energy into said microwave heating chamber, wherein at least a portion of said microwave energy discharged into said microwave heating chamber is used to increase the temperature of the coldest portion of each of said articles from an initial temperature to a final target temperature; (iii) during at least a portion of said heating, measuring the actual value of said first system control parameter to provide a measured value; and (iv) comparing the measured value of said first system control parameter with said operating set point to determine a difference; (e) when the difference determined in step (iv) exceeds a predetermined allowable difference, selecting a new group of set point values from said operating profile, wherein said new group of set point values includes a second target value for said first system control parameter, and wherein said second target value is used in said control system as a new operating set point for said first system control parameter; (f) operating said microwave heating system according to said new group of operating set points; and (g) removing pasteurized or sterilized articles from said microwave heating system.

Statement 44. The method of Statement 43, wherein said first system control parameter is selected from the group consisting of total net microwave power discharged, liquid temperature in said microwave heating chamber, liquid flow rate in said microwave heating chamber, and convey speed of said carrier through said microwave heating chamber.

Statement 45. The method of Statement 43, wherein said first group of set point values and said new group of set point values are each selected to achieve said temperature-time profile.

Statement 46. The method of Statement 43, wherein said operating profile includes at least a first temperature-time profile and a second temperature-time profile, wherein said first group of set point values is selected to achieve said first temperature-time profile and said new group of set point values is selected to achieve said second temperature-time profile.

Statement 47. The method of Statement 43, wherein said group of set point values is selected to achieve a first target $F_0$ value and said new group of set point values is selected to achieve a second target $F_0$ value, wherein the pasteurized or sterilized articles removed from said microwave heating system have achieved an $F_0$ value greater than or equal to at least one of said first and said second target $F_0$ values.

Statement 48. The method of Statement 43, wherein said group of set point values and said new group of set point values are selected to achieve a target $F_0$ value, wherein the pasteurized or sterilized articles removed from said microwave heating system have achieved an $F_0$ value greater than or equal to said target $F_0$ value.

Statement 49. The method of Statement 43, wherein said selecting of step (e) includes comparing the measured value of said first system control parameter to target values for said first system control parameter in one or more other groups of set point values of said operating profile and choosing as said new group of set point values the group of set point values that includes the target value for said first system control parameter that differs from the measured value of said first system control parameter by less than said predetermined difference.

Statement 50. The method of Statement 49, wherein said first group of set point values includes a first target value for a second system control parameter and said new group of set point values includes a second target value for said second system control parameter, wherein said selecting of step (c) includes using said first target value for said second system control parameter as an operating set point for said second system control parameter during said operating of step (d), and wherein said selecting of step (e) includes using said second target value for said second system control parameter as a new operating set point for said second system control parameter during said operating of step (f).

Statement 51. A method for heating a plurality of articles using a liquid-filled microwave heating system, said method including: (a) passing a carrier loaded with a plurality of articles through a liquid-filled microwave heating chamber along a convey line, wherein said articles are submerged in a liquid medium during said passing; (b) during at least a portion of said passing, discharging microwave energy into said microwave heating chamber, wherein at least a portion of said microwave energy is used to heat said articles; (c) during at least a portion of said discharging, measuring at least one value for a first system control parameter to provide at least one measured value; (d) removing the heated articles from said microwave heating chamber; (e) accessing an operating profile for said microwave heating system, wherein said operating profile is one or more groups of set point values, wherein each group of set point values includes at least one target value for said first system control parameter; (f) comparing said measured value with the target value in at least one of said groups of set point values to determine a difference; and (g) based on said difference, determining whether said articles were heated according to said operating profile.

Statement 52. The method of Statement 51, wherein said determining of step (g) includes comparing said difference with a predetermined allowable difference, and wherein when said difference is less than said predetermined allowable difference, said articles have been heated according to said operating profile, and when said difference is more than said predetermined allowable difference, said articles have not been heated according to said operating profile.

Statement 53. The method of Statement 52, further including when said articles have not been heated according to said operating profile, taking one or more actions with regard to the articles, wherein said actions are selected from the group consisting of discarding at least a portion of the articles, reheating the articles, modifying said operating profile, and creating a new operating profile based on said measured value.

Statement 54. The method of Statement 51, further including entering said measured value into said computer, wherein said measuring of step (c) includes measuring a value for a first system control parameter to provide a first measured value and a value for a second system control parameter to provide a second measured value, wherein said entering of step (e) includes entering said first and said second measured values into said computer, wherein each of said groups of set point values includes a first target value for said first system control parameter and a second target value for said second control parameter, and wherein said comparing includes comparing said first measured value with the first target value for said first system control parameter in a first group of set point values to determine a first difference and comparing said second measured value with the second target value for said second control parameter in said first group of set point values to determine a second difference, and based on said first and said second difference, determining whether or not said articles were heated according to said operating profile.

Statement 55. The method of Statement 51, wherein said operating profile includes at least a first group of set point values including a first target value for said first system control parameter and a second group of set point values including a second target value for said first system control parameter, and wherein said comparing includes comparing said measured value to said first target value to determine a first difference and comparing said measured value to said second target value to determine a second difference, and wherein said determining includes comparing said first and second differences to a predetermined allowable difference to determine whether said articles were heated according to said operating profile.

I claim:

1. A method for processing articles, the method comprising:
   accessing an operating profile for heating a type of article using a microwave heating system, the operating profile including a first group of set point values for operating the microwave heating system to heat the type of article according to a first heating process and a second group of set point values for operating the microwave heating system to heat the type of article according to a second heating process different than the first heating process; and
   using a control system operatively coupled to the microwave heating system, operating the microwave heating system according to the first group of set point values, the first group of set point values including a target value for a control parameter of the microwave heating system, wherein operating the microwave heating system according to the first group of set point values includes:
     passing a carrier loaded with a plurality of articles of the type of article corresponding to the operating profile through a liquid-filled microwave heating chamber along a convey line such that the plurality of articles is submerged in a liquid medium within the microwave heating chamber, and
     while passing the carrier through the microwave heating chamber, discharging microwave energy into the microwave heating chamber, the microwave energy used to heat the plurality of articles.

2. The method of claim 1, wherein:
   the discharging is performed using a plurality of microwave launchers configured to emit microwave energy into said microwave heating chamber, the microwave launchers being spaced apart from one another along a direction of travel of the carrier along the convey line;
   operating the microwave heating system further includes:
     passing the carrier past a first launcher of the plurality of microwave launchers and into a space between the first launcher and a second launcher of the plurality of microwave launchers adjacent the first launcher; and
     holding the carrier in the space for a dwell time during which the articles are not exposed to microwave energy during the dwell time, and
   the control parameter is total dwell time and the target value is at least one of greater than about 10 seconds and less than about 10 minutes.

3. The method of claim 1, wherein operating the microwave heating system further includes:
   passing the carrier through a liquid-filled preheating section along a convey line prior to passing the carrier through the microwave heating chamber; and submerging the articles in a warm liquid medium in the preheating section during the passing of the carrier through the preheating section, and wherein the control parameter is liquid temperature in the preheating section and the target value is at least one of greater than about 45° C. and less than about 95° C.

4. The method of claim 1, wherein operating the microwave heating system further includes:

passing the carrier through a liquid-filled holding section along a convey line subsequent to passing the carrier through the microwave heating chamber; and submerging the articles in a warm liquid medium in the holding section during the passing of the carrier through the holding section, and wherein the control parameter is liquid temperature in the holding section and the target value is at least one of greater than about 65° C. and less than about 140° C.

5. The method of claim 1, wherein operating the microwave heating system further includes:

passing the carrier through a liquid-filled cooling section along a convey line subsequent to passing the carrier through the microwave heating chamber; and submerging the articles in a cool liquid medium in the cooling section during the passing of the carrier through the cooling section, and wherein the control parameter is liquid temperature in the cooling section and the target value is from and including about 35° C. and less than about 65°.

6. The method of claim 1, wherein operating the microwave heating system further includes:

(i) during at least a portion of the heating of the plurality of articles, measuring a value of the control parameter to provide a measured value;

(ii) comparing the measured value with the target value for the control parameter to determine a difference;

(iii) comparing the difference with a predetermined allowable difference (PAD); and (iv) when the difference is greater than the PAD, one or more of:

discarding the plurality of articles;

rerunning the plurality of articles through the microwave heating system;

changing a total net microwave power discharged into the microwave heating chamber;

changing a liquid flow rate in the microwave heating chamber;

changing a liquid temperature in the microwave heating chamber; and changing a convey speed of the carrier through the microwave heating chamber.

7. The method of claim 1, wherein the control parameter is a liquid flow rate in a section of the microwave heating system and the target value is at least one of greater than about 1 gallon per minute (gpm) and less than about 75 gpm.

8. The method of claim 1, wherein the control parameter is convey speed through a section of the microwave heating system and the target value is at least one of greater than about 0.25 inches per second (in/s) and less than about 6 in/s.

9. The method of claim 1 further comprising:

measuring the control parameter to provide a measured value;

calculating a difference between the measured value and the target value; and responsive to determining the difference exceeds a predetermined allowable difference, operating the microwave heating system according to the second group of set point values.

10. The method of claim 9, wherein:

the second group of set point values includes a second target value for the control parameter, and operating the microwave heating system according to the second group of set point values is further in response to determining a difference between the second target value for the control parameter and the measured value differ by less than the predetermined allowable difference.

11. The method of claim 1, further comprising:

measuring the control parameter to provide a measured value;

calculating a difference between the measured value and the target value; and responsive to determining the difference exceeds a predetermined allowable difference, at least one of:

discarding the plurality of articles;

rerunning the plurality of articles through the microwave heating system;

changing a total net microwave power discharged into the microwave heating chamber;

changing a liquid flow rate in the microwave heating chamber;

changing a liquid temperature in the microwave heating chamber; and changing a convey speed of the carrier through the microwave heating chamber.

12. A method for processing articles, comprising:

(a) obtaining an operating profile for heating a type of article in a liquid-filled microwave heating system, the operating profile including a temperature-time profile for a target $F_0$ value and a first group of set point values for achieving the temperature-time profile;

(b) selecting the first group of set point values from the operating profile, the first group of set point values including a first target value for a control parameter of the microwave heating system, the first target value used by a control system operatively coupled to the microwave heating system as a first operating set point for the control parameter; and (c) using the control system operatively coupled to the microwave heating system, operating the microwave heating system by:

(i) passing a carrier loaded with a plurality of articles through a liquid-filled microwave heating chamber along a convey line, wherein the articles are submerged in a liquid medium during passing through the microwave heating chamber;

(ii) while passing the carrier through the microwave heating chamber, discharging microwave energy into the microwave heating chamber to heat the plurality of articles;

(iii) while heating the plurality of articles, measuring an actual value of the control parameter to provide a measured value; and (d) in response to determining a difference between the measured value and the first target value exceeds a predetermined allowable difference, selecting a second group of set point values from the operating profile, the second group of set point values including a second target value for the control parameter; and (e) using the control system, operating the microwave heating system according to the second group of set point values, including using the second target value as a second operating set point for the control parameter.

13. The method of claim 12, wherein the control parameter is selected from the group consisting of total net microwave power discharged into the microwave heating chamber, liquid temperature in a section of the microwave heating system, liquid flow rate in a section of the microwave heating system, and convey speed of the carrier through a section of the microwave heating system.

14. The method of claim 12, wherein the second group of set point values is for achieving the temperature-time profile.

15. The method of claim 12, wherein the temperature-time profile is a first temperature-time profile, the target $F_0$ value is a first target $F_0$ value, and the operating profile includes a second temperature-time profile for a second target $F_0$ value, the second group of set point values for achieving the second temperature-time profile.

16. The method of claim 15, wherein the first temperature-time profile is different than the second temperature-time profile.

17. The method of claim 15, wherein the first target $F_0$ value is different than the first target $F_0$ value.

18. The method of claim 15, wherein the selecting of step (d) is further in response to determining a difference between the second target value for the control parameter and the measured value differ by less than the predetermined allowable difference.

19. The method of claim 12, wherein:
the control parameter is a first control parameter,
the first group of set point values includes a first target value for a second control parameter different from the first control parameter,
the second group of set point values includes a second target value for the second control parameter,
the selecting of step (b) includes using the first target value for the second system control parameter as a first operating set point for the second system control parameter during the operating of step (d), and
the selecting of step (e) includes using the second target value for the second system control parameter as a second operating set point for the second system control parameter during the operating of step (e).

20. A microwave heating system comprising:
a plurality of liquid-filled processing sections including a microwave heating chamber section, each of the plurality of processing sections comprising a respective convey segment configured to transport a carrier with a plurality of articles through the processing section such that the articles are submerged in a liquid medium during passing through the processing section; and a control system operatively coupled to each of the plurality of processing sections to control operation of the processing sections, the control system adapted to:

(a) access an operating profile associated with a type of article, the operating profile including a temperature-time profile for a target $F_0$ value and a first group of set point values for achieving the temperature-time profile, the first group of set point values including a first target value for a control parameter of a processing section of the plurality of processing sections;

(b) operate the processing section in accordance with the group of set point values including using the first target value as a first operating set point for the control parameter;

(c) pass a carrier loaded with a plurality of articles through each processing section including the microwave heating chamber;

(d) while passing the carrier through the microwave heating chamber, discharge microwave energy into the microwave heating chamber to heat the plurality of articles;

(e) measure an actual value of the control parameter to provide a measured value;

(f) in response to determining a difference between the measured value and the first target value exceeds a predetermined allowable difference, select a second group of set point values from the operating profile, the second group of set point values including a second target value for the control parameter; and (g) following selecting of the second group of set point values, operate the processing section according to the second group of set point values, including using the second target value as a second operating set point for the control parameter.

* * * * *